United States Patent
Takabayashi et al.

(10) Patent No.: US 6,522,809 B1
(45) Date of Patent: Feb. 18, 2003

(54) WAVEGUIDE GRATING DEVICE AND METHOD OF CONTROLLING BRAGG WAVELENGTH OF WAVEGUIDE GRATING

(75) Inventors: Masakazu Takabayashi, Tokyo (JP); Kiichi Yoshiara, Tokyo (JP); Sadayuki Matsumoto, Tokyo (JP); Junichiro Hoshizaki, Tokyo (JP); Takeyuki Maegawa, Tokyo (JP); Hajime Takeya, Tokyo (JP); Kiyohide Sakai, Tokyo (JP); Minoru Hashimoto, Tokyo (JP); Fusaoki Uchikawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 350 days.

(21) Appl. No.: 09/640,000

(22) Filed: Aug. 17, 2000

(30) Foreign Application Priority Data

| Aug. 19, 1999 | (JP) | ............................................ 11-232688 |
| Jan. 26, 2000 | (JP) | ....................................... 2000-017022 |
| Jul. 7, 2000 | (JP) | ....................................... 2000-206869 |

(51) Int. Cl.$^7$ ................................................. G02B 6/34
(52) U.S. Cl. ............................. 385/37; 385/24; 385/39; 359/130
(58) Field of Search ............................ 385/37, 24, 13, 385/137; 359/124, 130

(56) References Cited

U.S. PATENT DOCUMENTS

| 5,042,898 | A | | 8/1991 | Morey et al. | |
| 5,774,619 | A | * | 6/1998 | Bruesselbach | ............... 385/137 |
| 5,978,539 | A | | 11/1999 | Davies et al. | |
| 6,144,789 | A | * | 11/2000 | Engleberth et al. | ............ 385/37 |
| 6,422,084 | B1 | * | 7/2002 | Fernald et al. | ................. 73/705 |

FOREIGN PATENT DOCUMENTS

| JP | 06-237829 | 4/1996 |
| JP | 8-101310 | 4/1996 |
| JP | 9-288205 | 11/1997 |
| JP | 10-186167 | 7/1998 |
| JP | 10-339821 | 12/1998 |

OTHER PUBLICATIONS

Arai et al., "Temperature Compensation For Add/Drop Filter On PLC", 1999 General Conference of the Institute of Electronics, Information and Communication Engineers, p. c–3–98.

* cited by examiner

*Primary Examiner*—Hemang Sanghavi
(74) *Attorney, Agent, or Firm*—Leydig, Voit & Mayer, Ltd.

(57) ABSTRACT

A waveguide grating device controlling Bragg wavelength after manufacture of the device includes an optical waveguide on a substrate. A variable stress is applied to a waveguide grating in part of the waveguide to bend at least the portion of the substrate including the waveguide grating, changing the Bragg wavelength.

18 Claims, 26 Drawing Sheets

4: Substrate support body

1: Optical waveguide
2: Waveguide grating
3: Substrate

4: Substrate support body

72: Waveguide grating device

Low Temperature     high Temperature

WAVEGUIDE GRATING DEVICE AND METHOD OF CONTROLLING BRAGG WAVELENGTH OF WAVEGUIDE GRATING

BACKGROUND OF THE INVENTION

1. Field of the Invention

The present invention relates to a method of controlling the Bragg wavelength and a method of compensating for temperature dependency of the Bragg wavelength of a waveguide grating, and a waveguide grating device using the same.

2. Description of the Related Art

In a wavelength division multiplexing(WDM) system, an optical multiplexer/demultiplexer that combines or splits wavelength-multiplexed signals, a band pass filter and a dispersion compensator that compensates for dispersion of an optical fiber that transmits signals are key devices, with improvements in the characteristics thereof being viewed as important issues.

Recently, particularly as advancements in the WDM systems have been made, such needs have been mounting to improve the Bragg wavelength control technology and improve the temperature characteristic of the Bragg wavelength of an optical multiplexer/demultiplexer that combines or splits wavelength-multiplexed signals, a band pass filter and a dispersion compensator.

FIG. 25 shows an example of a band pass filter of the prior art that utilizes a waveguide grating. This waveguide grating has a function of reflecting light of a particular wavelength, with the Bragg wavelength $\lambda B$ being defined by the following formula (1), where $n_{eff}$ denotes the effective refractive index of the waveguide grating, and $\Lambda$ denotes the period of the waveguide grating.

$$\lambda B / n_{eff} 2 \Lambda \quad (1)$$

In the band pass filter shown in FIG. 25, light incident on a port P1 is divided into two portions by a 3 dB coupler 105. Light of the same wavelength as the Bragg wavelength $\lambda B$ of a grating 102, namely the signal light, is reflected from the grating 102 and synthesized in the 3 dB coupler 105 again and is output from the port P2. Light having a wavelength different from the Bragg wavelength $\lambda B$ of the grating, namely noise light, is transmitted through the grating 102 and is output from ports P3, P4. Thus the band pass filter of FIG. 25 is capable of cutting off the noise light and extracting only the signal light from the port P2.

FIG. 26 shows an example of a multiplexer/demultiplexer that utilizes the waveguide grating. In the multiplexer/demultiplexer of the prior art shown in FIG. 26, for example, when signals of different wavelengths ($\lambda 1, \lambda 2, \lambda 3, \ldots$) enter a port P1, only the signal light of a particular wavelength ($\lambda 1$ in the drawing) is reflected from the grating 102 and is output from the port P2 (demultiplexing). Signal light of other wavelengths ($\lambda 2, \lambda 3, \ldots$) is output from the port P4. Signal light having a particular wavelength (light having wavelength $\lambda 1$) that has entered the port P3 is reflected from the grating 102 and is output from the port P4 (multiplexing).

FIG. 27 shows an example of a dispersion compensator that utilizes the waveguide grating. In optical communication, since an optical fiber used as a medium for transmitting optical signals experiences dispersion due to the refractive index changing depending on wavelength, propagation speed along the propagation path varies depending on the wavelength of the light, thus resulting in different amounts of group delay for different wavelengths. Since an optical pulse signal has a certain spread in wavelength, the pulse signal is broadened as shown in FIG. 28B after having been propagated over several tens of kilometers, due to the difference in group delay by the wavelength (FIG. 28A shows signal waveform before propagation and FIG. 28B shows signal waveform after propagation). Therefore, ultrahigh speed optical communication requires a technique for compensating for the dispersion in the optical fiber.

Relation between wavelength and group delay during propagation through an optical fiber is shown in FIG. 29A, with the dispersion that is given by differentiation thereof being shown in FIG. 29B. Compensating for this effect requires a device that has such group delay and dispersion characteristics as shown in FIGS. 30A, 30B, which can be achieved by means of a dispersion compensator shown in FIG. 27. The waveguide grating 102 of the dispersion compensator is formed so that the period thereof becomes longer as the distance from the input port increases. With such a configuration that the period changes as described above, reflecting position changes with the wavelength of the light thus resulting in such a gradient in group delay as shown in FIG. 30A. That is, dispersion remains a constant and positive value as shown in FIG. 30B, thus making it possible to compensate for the dispersion because of the sign of this dispersion reverse to the dispersion of the optical fiber.

FIG. 31 shows an example of a variable dispersion compensator that utilizes a waveguide grating. Since the amount of dispersion that a dispersion compensator is required to compensate varies, depending on the length of an optical fiber used as the propagation path and on the conditions of operation, when a dispersion compensator of a fixed amount of dispersion to be compensated is used, the optimum dispersion compensator has been selected by preparing a plurality of dispersion compensators of different amounts of dispersion and inserting them successively. The variable dispersion compensator shown in FIG. 31, by contrast, is capable of making a fine adjustment of the dispersion and therefore makes it possible to solve the problem of the trials and errors being required to determine the optimum dispersion compensator. Specifically, in the variable dispersion compensator shown in FIG. 31, heating means 24a, 24b apply heat to the optical waveguide. At this time, a temperature gradient is generated in the waveguide grating by differentiating the calorific values generated by the heating means 24a and the heating means 24b.

The effective refractive index $n_{eff}$ of the waveguide grating is a function of temperature. Consequently, the temperature gradient generated by applying different amounts of heat from the heating means 24a and the heating means 24b causes a gradient in the effective refractive index $n_{eff}$ of the optical waveguide along the longitudinal direction of waveguide. With this configuration, since the Bragg wavelength becomes a function of $n_{eff}$ as shown by formula (1), the Bragg wavelength changes with the position along the longitudinal direction of the waveguide grating. As a result, the temperature gradient gives an effect similar to the so-called chirped grating, so that the distance from the reflecting point differs depending on the wavelength, thereby causing dispersion. With this configuration, relations of the temperature gradient with the group delay and the dispersion become as shown in FIGS. 32A, 32B, and 32C, thus making it possible to adjust the dispersion according to changes in the temperature gradient generated by the heating means.

Now a method of producing the waveguide grating used in the optical devices described above will be described. Typical methods of producing the waveguide grating include one that utilizes light-induced change in refractive index. The light-induced change in refractive index refers to the change that occurs in the refractive index of a silica-based optical waveguide, that is doped with germanium, when irradiated with ultraviolet rays. Specifically, when two rays of ultraviolet light are incident on the waveguide and interfere with each other and form a fringe pattern, the refractive index of the waveguide changes according to the period of the fringe pattern, thus generating a waveguide grating. Though the change in the refractive index is as small as on the order of 0.001, the grating has a very small period of about 500 nm and therefore a waveguide grating of around 20000 periods can be produced with a length of about 1 cm, thus easily achieving about 100% reflectivity at the Bragg wavelength.

The waveguide gratings produced as described above have variations in the grating period due to variability in the production process, resulting in some variations in the Bragg wavelength of the grating. The Bragg wavelength also becomes greater when the intensity and/or irradiation time of the ultraviolet radiation increases or the waveguide grating is formed in a direction deviated from the direction perpendicular to the propagating direction of light through the waveguide due to the producing facility or other condition during production of the waveguide grating. Thus a process of adjusting the Bragg wavelength is required. In the prior art, such methods have been employed to adjust the Bragg wavelength as measuring the Bragg wavelength after forming the waveguide grating and, in case the measured Bragg wavelength is different from the desired value, the waveguide grating is further irradiated with ultraviolet light (Unexamined Patent Publication (Kokai) No. 9-288205) or applying heat (Unexamined Patent Publication (Kokai) No. 10-339821).

The effective refractive index $n_{eff}$ of the optical waveguide made of silica-based material also changes with temperature, and the Bragg wavelength $\lambda B$ accordingly changes following the formula (1) as shown in FIG. 32C. Since a grating formed on a silica-based waveguide normally has a refractive index that changes at a rate of 0.01 nm/° C., some measures must be taken to prevent the Bragg wavelength from changing with the temperature change in the band pass filter, the multiplexer/demultiplexer and the dispersion compensator. Since the problem of the Bragg wavelength changing with temperature occurs due to the temperature characteristic of the material, the Bragg wavelength has been prevented from changing in the prior art by such methods as controlling the temperature by means of a Peltier element or the like, or covering the waveguide with an optical medium that has an inverse temperature dependency to that of the refractive index of the waveguide (Unexamined Patent Publication (Kokai) No. 10-186167). At the general conference of Electronic Communications Engineering Association, 1999, Arai et al. gave a report titled "Temperature characteristic compensation for waveguide type Add/Drop filter" (C-3-98), proposing such techniques as bonding on a substrate a metal plate or the like that has a higher thermal expansion coefficient than the substrate including the waveguide.

However, such methods as re-irradiating the waveguide grating with ultraviolet light and applying heat have problems such as taking a long time for adjustment and being incapable of being produced at a low cost.

As to the configuration for improving the temperature characteristic (decreasing the change in Bragg wavelength with temperature change), there has been a problem of complicated configuration and long period of time taken in production, in any of the methods of controlling the temperature by means of a Peltier element or the like, covering the waveguide with an optical medium that has an inverse temperature dependency to that of the refractive index of the waveguide and bonding on the substrate a metal plate or the like having higher thermal expansion coefficient than the substrate including the waveguide.

SUMMARY OF THE INVENTION

Accordingly, a first object of the present invention is to provide a waveguide grating device that allows it to control the Bragg wavelength more easily than in the prior art after production.

A second object of the present invention is to provide a waveguide grating device capable of reducing the change in the Bragg wavelength due to temperature change.

A third object of the present invention is to provide a method of adjusting the Bragg wavelength of a waveguide grating device that allows it to control the Bragg wavelength easily after production.

In order to achieve the object described above, a first waveguide grating device of the present invention comprises an optical waveguide formed on a substrate and a waveguide grating formed in a portion of the waveguide, wherein bending stress applying means is provided for bending at least a portion of the substrate whereon the waveguide grating is formed.

With this configuration, since the portion of the substrate whereon the waveguide grating is formed can be bent by means of the bending stress applying means, it is made possible to change the grating period of the waveguide grating thereby changing the Bragg wavelength thereof.

Thus the grating period of the waveguide grating can be changed by bending the portion where the waveguide grating is formed after forming the waveguide grating.

Therefor the waveguide grating device of the present invention is capable of changing the Bragg wavelength after forming the waveguide grating, the Bragg wavelength can be controlled more easily than in the prior art.

In the first waveguide grating device of the present invention, in case the substrate is housed in a casing, the substrate can be fastened in the casing on both sides of the waveguide grating by means of substrate support bodies, and the bending stress applying means may be substrate pressing means that is installed in the casing so as to make contact with the substrate above the waveguide grating and is movable in the direction perpendicular to the substrate.

With this configuration, the Bragg wavelength can be controlled easily with a simple constitution.

In the first waveguide grating device described above, distance L1 between the substrate support bodies is preferably set so as to satisfy a relation of inequality t1/L1<0.2 with t1 representing the thickness of the substrate, which makes it possible to effectively change the Bragg wavelength of the waveguide grating.

With this configuration, it is made possible to effectively change the Bragg wavelength of the waveguide grating and easily control the Bragg wavelength.

Further in the first waveguide grating device of the present invention, it is preferable that the substrate pressing means has an arc shape with the center thereof located at a point, or an arc-shaped end portion having an axis lying on a straight line that is parallel to the substrate, which makes it possible to prevent the substrate from breaking. Therefore it is possible to improve the reliability.

In the first waveguide grating device of the present invention, the substrate pressing means may also be provided so as to make contact with the surface of the substrate whereon the waveguide grating is formed.

In this configuration, the Bragg wavelength can be decreased by pressing.

Also in the first waveguide grating device of the present invention, the substrate pressing means may also be provided so as to make contact with the surface of the substrate opposite to the surface thereof whereon the waveguide grating is formed.

In this configuration, the Bragg wavelength can be increased by pressing.

Also in the first waveguide grating device of the present invention, the bending stress applying means may be a stress applying plate that is connected to the surface of the substrate so as to oppose the waveguide grating and has a thermal expansion coefficient different from that of the substrate, with the stress applying plate being connected to the surface of the substrate whereon the waveguide grating is formed.

With this configuration, the constitution can be made compact and simple since the bending stress applying means can be made without using the casing.

Also in the first waveguide grating device of the present invention, the substrate pressing means may be an actuator that expands and contracts in response to a voltage applied thereto.

With this configuration, the Bragg wavelength can be controlled electrically.

Further in the first waveguide grating device of the present invention, a first portion of the substrate where the waveguide grating is formed is preferably made thinner than the other portion. This configuration makes it possible to generate a relatively large bending stress in the substrate with a relatively weak force.

Therefore it is possible to control the Bragg wavelength efficiently.

Also in the first waveguide grating device of the present invention, the waveguide grating can be formed so that the grating period thereof changes progressively.

With this configuration, the waveguide grating device can function as a dispersion compensator.

Therefore it is made possible to provide the dispersion compensator capable of controlling the Bragg wavelength more easily than the prior art after production.

The method of adjusting the Bragg wavelength of the waveguide grating according to the present invention is a method of adjusting the Bragg wavelength of the waveguide grating formed in a portion of an optical waveguide that is formed on the substrate, wherein a bending stress is applied so as to bend at least a portion of the substrate where the waveguide grating is formed, thereby changing the grating period of the waveguide grating.

With this configuration, since the portion of the substrate whereon the waveguide grating is formed can be bent by the bending stress applying means, grating period of the waveguide grating can be changed so that the Bragg wavelength can be changed.

Therefore it is possible to change the Bragg wavelength easily.

A second waveguide grating device of the present invention comprises a substrate, whereon a waveguide grating and an optical waveguide connected to the waveguide grating are formed, that is supported in a casing on one of principal planes of the substrate by using substrate support bodies, wherein substrate pressing means is installed in the casing so as to make contact with the other principal plane of the substrate in such a condition as being movable in a direction perpendicular to the substrate or being fixed, while the thermal expansion coefficient of either the substrate support body or the substrate pressing means, or alternatively the thermal expansion coefficients of both the substrate support body and the substrate pressing means are set so that the thermal expansion coefficient cancels the change in the Bragg wavelength of the waveguide grating caused by a change in temperature.

With this configuration, temperature compensation can be made with a simple constitution.

In the second waveguide grating device of the present invention, it is more preferable that the substrate support body has an end face of arc shape having radius of curvature with an axis lying on a straight line that is parallel to the substrate so as to alleviate the concentration of load, while making linear contact with the substrate on the end face.

With this configuration, the substrate can be prevented from breaking and reliability can be improved further.

Also in the second waveguide grating device of the present invention, it is preferable that end portion of the substrate pressing means has arc shape having radius of curvature with center thereof located on one point or an axis lying on a straight line that is parallel to the substrate so as to alleviate the concentration of load.

In this configuration, since concentration of the load on the substrate can be alleviated by forming the end portion of the substrate pressing means in arc shape having radius of curvature having center on one point or an axis lying on a straight line that is parallel to the substrate, the substrate can be prevented from breaking and reliability can be improved.

In the second waveguide grating device of the present invention, substrate pressing means may also be provided in plurality. In this case, the substrate pressing means are preferably installed on both sides of the waveguide grating, which makes it possible to substantially uniformly distribute the stress generated in the portion of the substrate where the waveguide grating is formed under a load.

Therefore deterioration of the characteristic due to uneven stress distribution can be prevented.

Also in the second waveguide grating device of the present invention, the substrate pressing means may be provided, on the end portion thereof, a load splitting member having first and second end faces that make linear contact with the substrate and are parallel to each other, with the first and second end faces straddling the waveguide grating. With this configuration, it is also made possible to substantially uniformly distribute the stress generated in the portion of the substrate where the waveguide grating is formed under a load. With this configuration, it is possible to prevent deterioration of characteristic from occurring due to uneven stress distribution.

Also in the second waveguide grating device of the present invention, the substrate pressing means may also be provided, at an end thereof, with a flat plate having a top surface and a bottom surface that are parallel to each other. With this configuration, too, it is made possible to substantially uniformly distribute the stress generated in the portion of the substrate where the waveguide grating is formed under a load. Therefore it is possible to prevent deterioration of characteristic from occurring due to uneven stress distribution.

Further in the second waveguide grating device of the present invention, the surface of the substrate whereon the waveguide grating is formed is preferably provided with a organic material layer. In this configuration, the reliability can be improved further.

Also in the second waveguide grating device of the present invention, the substrate may also be hermetically sealed in the casing instead of providing the organic material layer. In this configuration, the reliability can be improved also by hermetically sealing the substrate in the casing instead of providing the organic material layer.

DETAILED DESCRIPTION OF THE PREFERRED EMBODIMENTS

Now embodiments of the present invention will be described below with reference to the accompanying drawings.

Prior to describing the individual embodiments, first the principle of the invention will be described taking reference to FIG. 1 through FIG. 4. In the description that follows, numeral 1 denotes an optical waveguide, 2 denotes a waveguide grating, 3 denotes a substrate and 4 denotes a substrate support body.

Figure 1A:
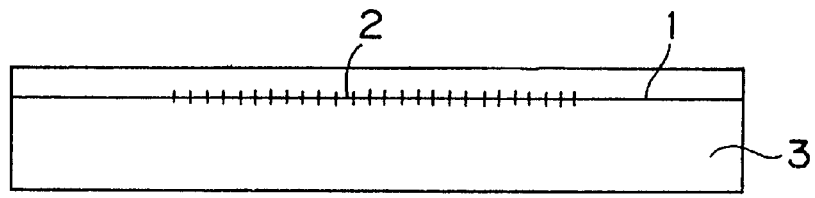
FIGS. 1A and 1B are schematic diagrams for explaining the principle of the present invention.
Figure 1B:
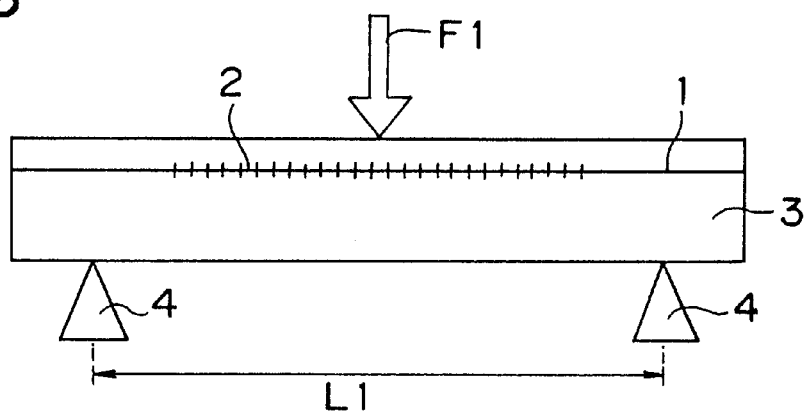

As shown in FIG. 1A, a substrate 3, whereon a waveguide grating 2 is formed by periodically changing the refractive index of a part of a waveguide 1, is supported by means of substrate support bodies 4 as shown in FIG. 1B, so that applying an extraneous force (stress) on the top surface of the substrate causes the substrate to bend thereby decreasing the grating period Λ of the waveguide grating, thus decreasing the Bragg wavelength that is given by the formula (1) described in conjunction with the prior art. The Bragg wavelength increases, on the contrary, when an extraneous force (stress) is applied as shown in FIG. 1C.

Figure 1C:
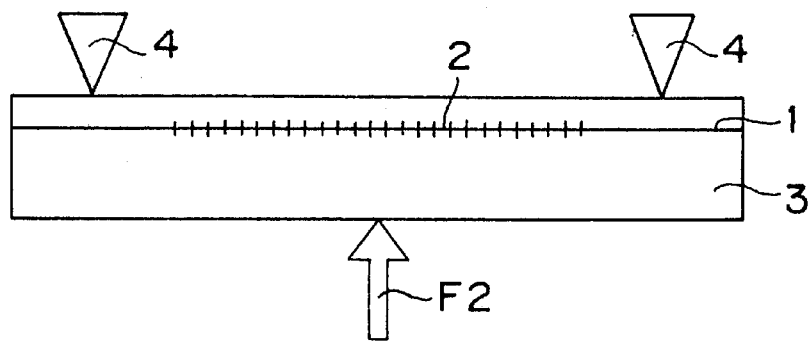
Figure 2A:
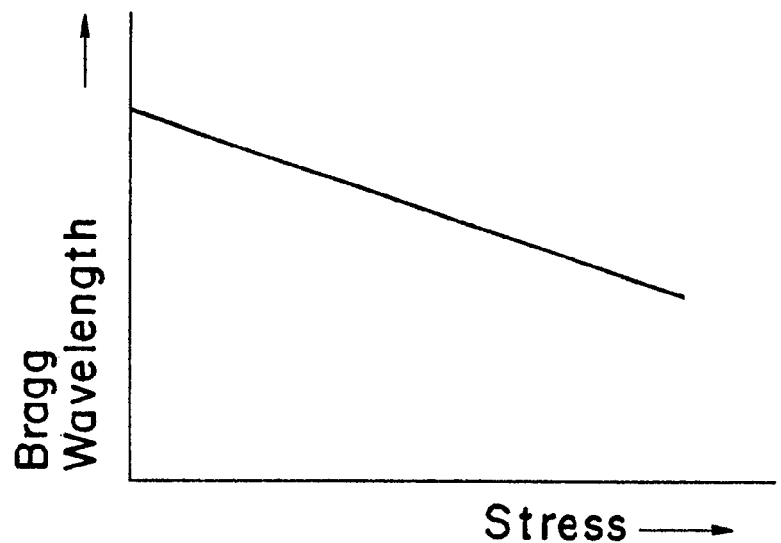
FIGS. 2A and 2B are graphs showing the relationship between the stress in the waveguide grating and the Bragg wavelength, FIG. 2A showing a case where the substrate is warped so that the surface where the waveguide is formed becomes concave, and FIG. 2B showing a case where the substrate is warped so that the surface opposite to that where the waveguide is formed becomes concave.
Figure 2B:
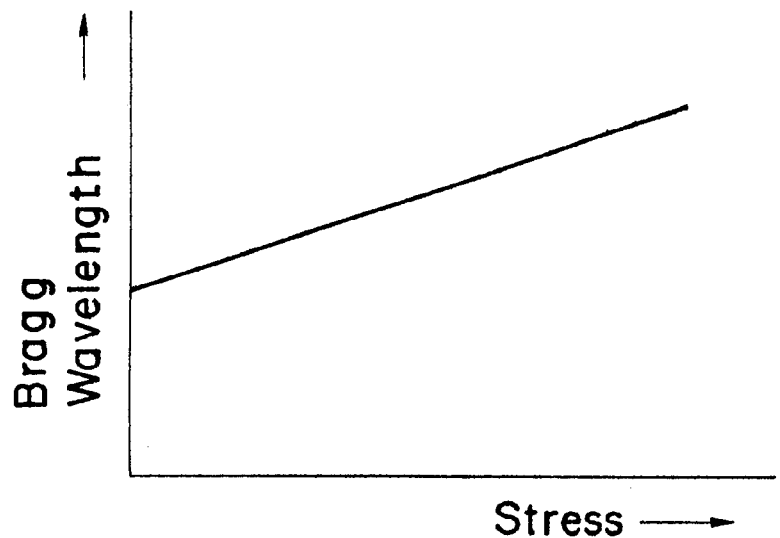

FIGS. 2A and 2B show the relationship between the Bragg wavelength and the stress when the stress is applied in directions shown in FIGS. 1B and 1C. Since the grating period Λ can be increased or decreased by changing the way in which the stress is applied, the Bragg wavelength can be controlled at will. As the ratio t1/L1 of the substrate thickness t1 to the distance L1 between the substrate support bodies 4 decreases, a gradient having the straight line shown in FIG. 2 becomes steeper, thus achieving greater change in the Bragg wavelength for a given stress of the same intensity. In actuality, since the change in the Bragg wavelength for a given stress cannot be made larger unless a relationship t1/L1<0.2 is satisfied, it is preferable to satisfy the relationship t1/L1<0.2.

Figure 3:
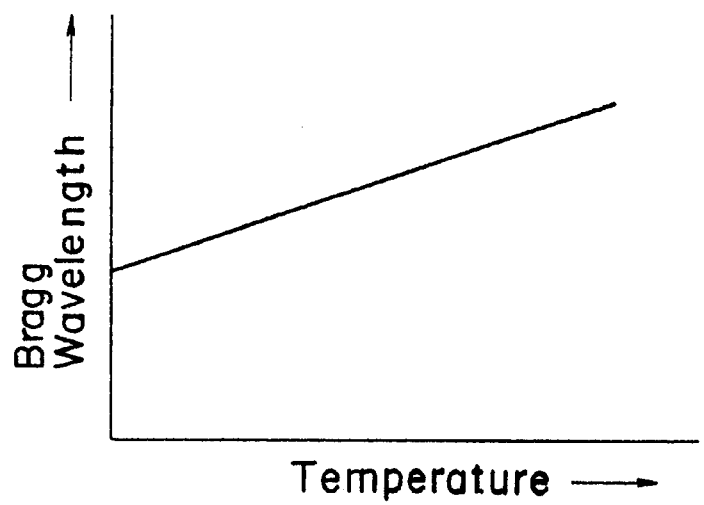
FIG. 3 is a graph showing the Bragg wavelength versus temperature without temperature compensation.
Figure 4:
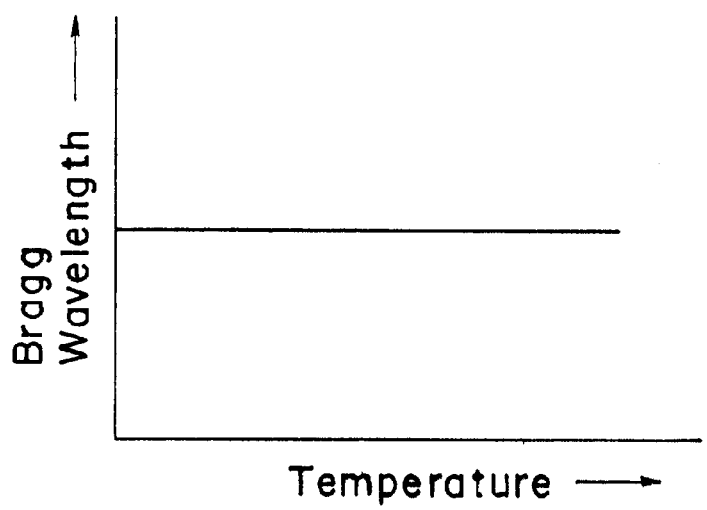
FIG. 4 is a graph showing the Bragg wavelength versus temperature with temperature compensation applied.

When the temperature changes, the effective refraction index of the portion of the waveguide grating 2 changes, and changes in the Bragg wavelength given by the formula (1) as temperature changes are as shown in FIG. 3. Therefore, when the change in the effective refraction index is canceled by a stress applied while changing the stress in accordance to the change in temperature, the temperature characteristic can be compensated so that the Bragg wavelength remains unchanged with the changing temperature as shown in FIG. 4.

Now specific constitutions related to the control (adjustment) of the Bragg wavelength and the compensation for temperature characteristic will be described by way of preferred embodiments with reference to the accompanying drawings.

Embodiment 1

A waveguide grating device 12 according to the first embodiment of the present invention is a band pass filter (BPF) that has such a band pass characteristic that passes light of signal wavelength and rejects noise, provided with a stress adjusting screw 8 for adjusting the Bragg wavelength of the waveguide grating 2.

Specifically, the waveguide grating device 12 of the first embodiment comprises a substrate 3 whereon a pair of waveguides 1, a 3 dB coupler 5 and a waveguide grating 2 are formed, the substrate 3 being supported by two substrate support bodies 4 that are installed on the bottom of a casing 7 at a predetermined distance from each other, with the stress adjusting screw 8 (substrate pressing means) being installed on a top plate of the casing 7 as stress applying means in contact with the substrate 3 in the space between the substrate support bodies 4. According to the first embodiment, in this configuration, band pass characteristic of the filter can be adjusted by applying an extraneous force to the substrate 3 by means of the stress adjusting screw 8 installed in the casing, thereby adjusting the Bragg wavelength of the waveguide grating 2.

Figure 5A:
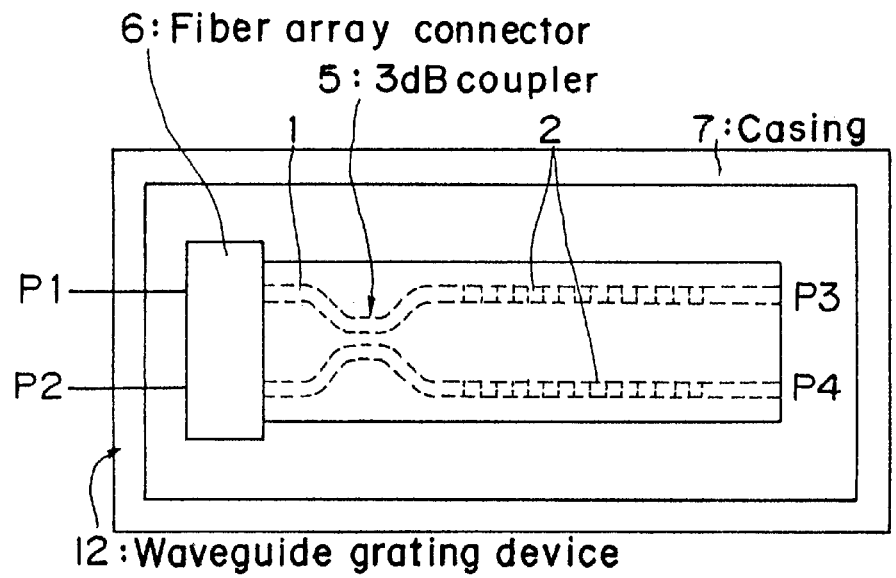
FIGS. 5A and 5B are schematic diagrams showing the constitution of the first embodiment of the present invention, FIG. 5A showing a plan view from above and FIG. 5B showing a side view.
Figure 5B:
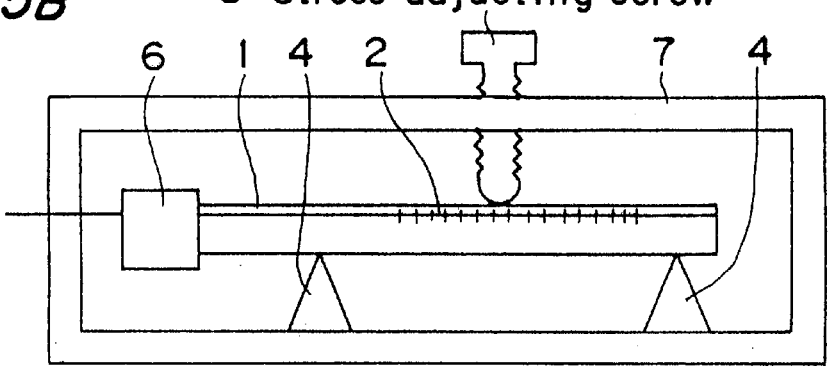

Now components of the waveguide grating device 12 of the first embodiment will be described in detail with reference to FIGS. 5A and 5B.

A pair of the waveguides 1 are formed symmetrically with respect to a line, for example, by disposing the waveguides made of a material based on quartz doped with germanium on top surface of the substrate 3. The 3 dB coupler 5 is formed by from a part of the waveguides by forming the part of the waveguides 2 to come nearer to each other.

The waveguide grating 2 is formed on a part of the substrate 1 by, for example, generating a fringe pattern on the part of each waveguide by means of ultraviolet rays, thereby changing the refractive index at a predetermined period. The waveguide grating 2 formed on each of the waveguides 1 to be symmetrical with respect to a line.

A fiber array connector 6 is connected to one end of each of the waveguides 1, and is fastened on one end of the substrate 3.

The substrate support bodies 4 are installed on the bottom of the casing 7 separated by a predetermined space.

The substrate support bodies 4 support the under side of the substrate 3 whereon the waveguides 1, the 3 dB coupler 5 and the waveguide grating device 2 are formed and the fiber array connector 6 is installed.

The substrate support bodies 4 are preferably configured to make linear contact with the substrate 3, the end portion of the substrate support body 4 that makes contact with the substrate 3 having an arc shape having radius of curvature with an axis lying on a straight line parallel to the substrate 3.

The stress adjusting screw 8 is installed on a top plate of the casing 7 to put the tip of the screw into contact with the top surface of the substrate 3 so that the substrate 3 supported by the substrate support bodies 4 can be bent in the portion where waveguide grating 2 is formed.

The tip of the stress adjusting screw 8 that is the substrate pressing means preferably has an arc shape having radius of curvature with the center thereof located at a point, or an arc shape having radius of curvature having an axis lying on a straight line that is parallel to the substrate, to prevent the load from being concentrated at a point.

In the band pass filter of the first embodiment constituted as described above, light that has entered the port P1 is divided by the 3 dB coupler 5 into two parts, one of which that has the Bragg wavelength $\lambda B$ of the waveguide grating 2, namely signal light, is reflected on the waveguide grating 2 and synthesized in the 3 dB coupler 5, thereby being output from the port P2. Light of wavelength different from the Bragg wavelength of the grating, namely noise light, is transmitted through the grating and output from the ports P3 and P4. Thus the band pass filter has a function of cutting off the noise light and passing only the signal light.

The band pass filter of the first embodiment has such a constitution that allows an extraneous force to be applied by the stress adjusting screw 8 to the portion where the waveguide grating 2 is formed. In the constitution shown in FIGS. 5A, 5B the substrate 3 is bent by the extraneous force applied thereto thereby decreasing the period of the waveguide grating 2 in accordance to the amount of bend, thus making it possible to decrease and adjust the Bragg wavelength to a desired value.

When the Bragg wavelength of the waveguide grating 2 is to be adjusted to a value larger than that set during production (before adjustment), the Bragg wavelength may be adjusted by applying an extraneous force by the stress adjusting screw 8, with the substrate 3 being set on the substrate support bodies 4 with the surface whereon the waveguide 1 is formed facing downward.

To sum up, in the constitution of the band pass filter of the first embodiment, when the Bragg wavelength (center frequency of the pass band of the filter) of the waveguide grating 2 is larger than the desired value, the substrate 3 is supported onto the substrate support bodies 4 with the surface of the substrate whereon the waveguide 1 is formed facing upward (to the side where it opposes the stress adjusting screw 8), and the Bragg wavelength is adjusted by applying the extraneous force by the stress adjusting screw 8 thereby bending the substrate and decreasing the grating period.

When the Bragg wavelength (center frequency of the pass band of the filter) of the waveguide grating 2 is smaller than the desired value, the substrate 3 is supported onto the substrate support bodies 4 with the surface whereon the waveguide 1 is formed facing downward (toward the side opposite to the stress adjusting screw 8), and the Bragg wavelength is adjusted by applying the extraneous force by the stress adjusting screw 8 thereby bending the substrate and increasing the grating period.

For example, when the band pass filter of which desired Bragg wavelength being 1553.0 nm is to be produced but the Bragg wavelength of the band pass filter before adjustment is 1552.5 nm, the substrate 3 is supported on the substrate support bodies 4 with the surface whereon the waveguide 1 is formed facing downward, and the Bragg wavelength is adjusted by applying the extraneous force by the stress adjusting screw 8.

Figure 6:
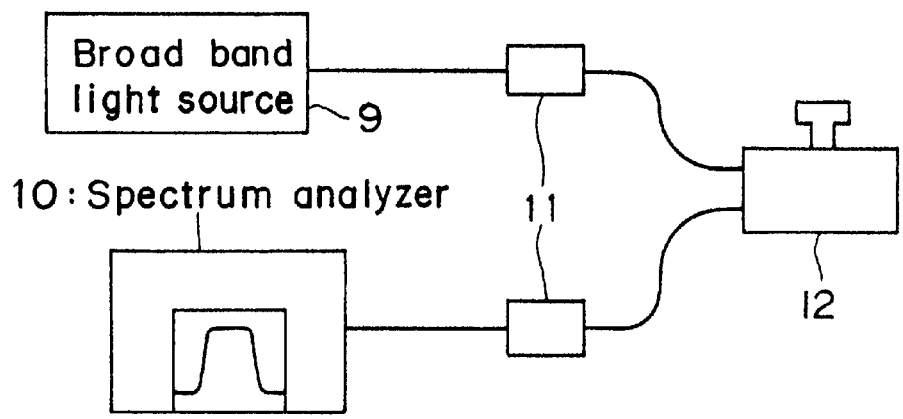
FIG. 6 is a block diagram of the optical system used in the embodiments.

Adjustment of the Bragg wavelength of the band pass filter can be done by using an optical measurement system as shown in FIG. 6.

The optical measurement system may employ amplified spontaneous emission of EDFA (Erbium-Doped Fiber Amplifier), for example, as a broad band light source 9. Light emitted by the broad band light source 9 is fed through an optical isolator 11 and the port P1 to the band pass filter, and light output from the port P2 is fed through the optical isolator 11 to a spectrum analyzer 10 to observe the wavelength characteristic.

Figure 7:
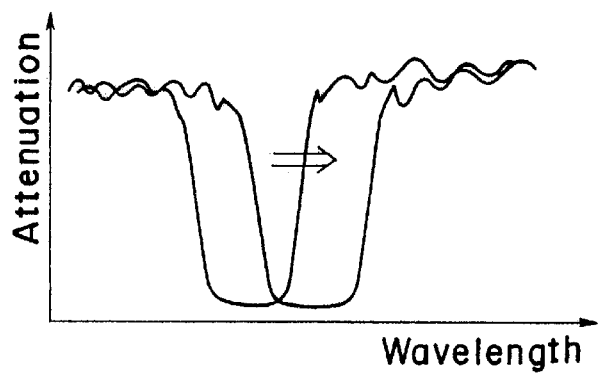
FIG. 7 is a graph schematically showing the Bragg wavelength being adjusted by using the optical measurement system shown in FIG. 6.

An example of adjustment by setting the Bragg wavelength larger than that obtained during production is shown in FIG. 7. In this case, the Bragg wavelength can be shifted to a longer wavelength by turning the stress adjusting screw 8 thereby applying an extraneous force, and fixing the stress adjusting screw 8 at a position where the desired Bragg wavelength is obtained. With the constitution of the first embodiment and the measurement system shown in FIG. 6, the Bragg wavelength can be adjusted very precisely with an accuracy of about ±0.01 nm.

Now the method of supporting (fastening) the substrate 3 in the casing 7 by means of the substrate support 4 will be described below.

In the first embodiment of the present invention, as described above, Bragg wavelength of the waveguide grating 2 is changed by bending the substrate 3. Therefore, it is necessary in the first embodiment to fasten the substrate 3 in the casing 7 in such a way that deflection of the substrate 3 under load is not impeded.

The substrate 3 may be fastened onto the substrate support 4 in the casing 7 by means of an adhesive or the like. According to a research conducted by the inventors of the present application, however, it was found that the change in the center wavelength per load becomes extremely small when the substrate 3 is bonded to the substrate support 4 and to the stress adjust screw 8.

Figure 8:
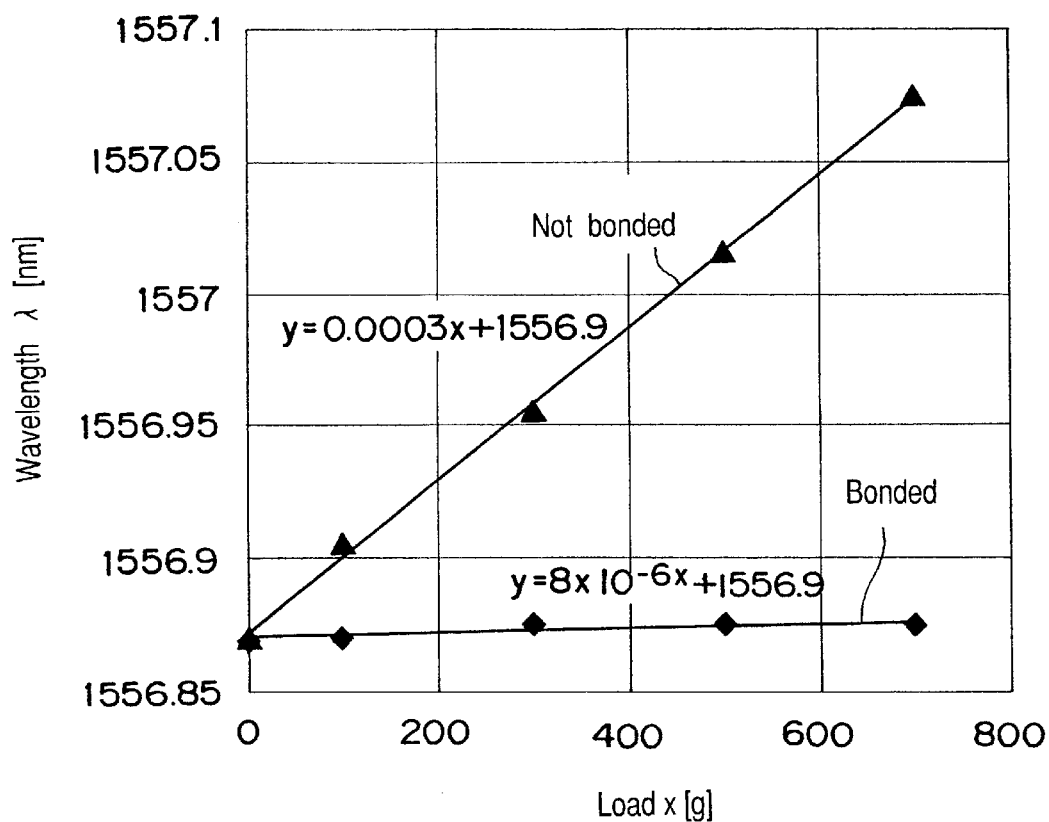
FIG. 8 is a graph showing the changes in the Bragg wavelength under load where the substrate is bonded to a substrate support, and is not bonded.

FIG. 8 is a graph showing the changes in the center wavelength under load in both cases where the substrate 3 is bonded to the substrate support 4 and to the stress adjust screw 8, and is not bonded.

In the research, the result shown in FIG. 8 was obtained by using the substrate 3 having a thickness of 1 mm that was supported by two substrate supports 4 disposed at a distance of 14 mm from each other.

As will be clear from FIG. 8, the change in the Bragg wavelength per load becomes extremely small when the substrate 3 is bonded to the substrate support 4 and to the stress adjust screw 8.

Figure 9:
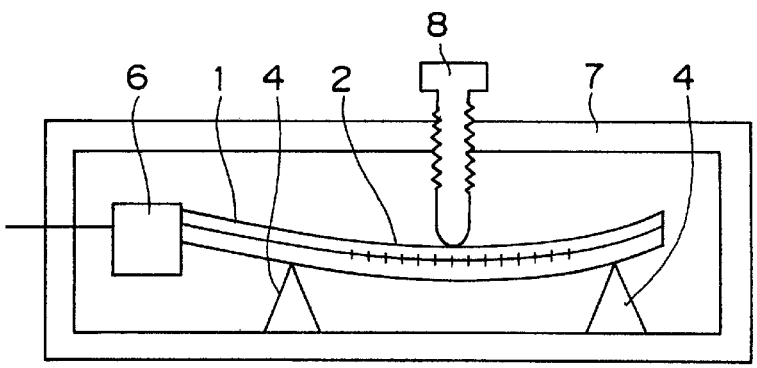
FIG. 9 is a illustration of the substrate supported by the substrate support in a casing.

Accordingly, in the first embodiment, the substrate is fastened while being bent so that a predetermined load is applied to the substrate when the Bragg wavelength is set to a desired value as shown in FIG. 9.

According to the first embodiment, practically sufficient fastening can be achieved by applying a load of 1000 g (1 kg).

Figure 10:
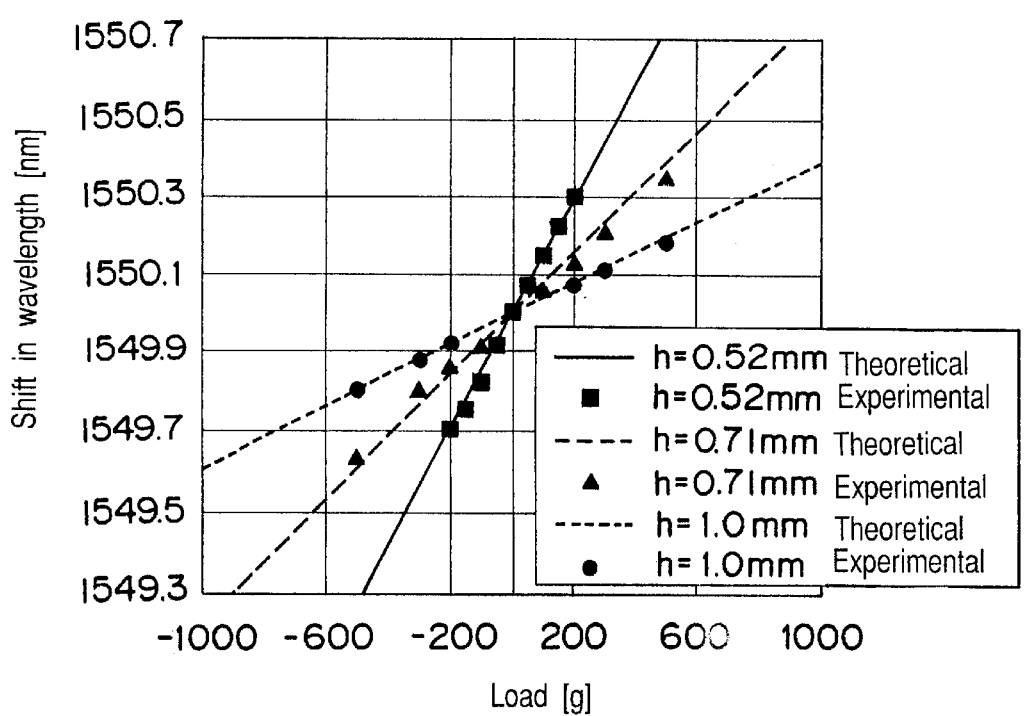
FIG. 10 is a graph showing the amount of shift in the Bragg wavelength vs. load.

FIG. 10 is a graph showing the amount of shift in the Bragg wavelength vs. load. Theoretical values and measured values are shown for cases where thickness h of the substrate 3 is 0.52 mm, 0.71 mm and 1.0 mm.

FIG. 10 shows that, when the waveguide grating device having target Bragg wavelength of 1555.0 nm is formed from a substrate having thickness of 0.7 mm, the target Bragg wavelength can be achieved with a load of about 1 kg applied, and the substrate 3 can be secured in the casing 7 without bonding, by making the substrate that has Bragg wavelength of 1555.7 nm when not loaded.

In FIG. 10, the load is assumed to have a positive value when bending the substrate 3 that is supported so that the surface thereof where the waveguide grating is formed opposes the substrate support 4, and a negative value when bending the substrate 3 that is supported so that the surface thereof where the waveguide grating is formed opposes the stress adjust screw 8.

In the first embodiment, since the substrate is fastened by loading, without bonding the substrate 3 to the substrate support 4 and to the stress adjust screw 8 as described above. Therefore, it is desirable to fasten the substrate 3 firmly by forming the substrate support and the substrate 3 as described below.

Figure 11A:
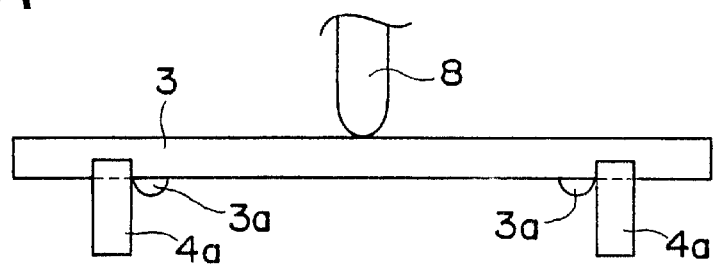
FIGS. 11A and 11B are illustrations showing an example (first example) where a substrate support has a recess for fastening the substrate and the substrate is fitted in the recess.
Figure 11B:
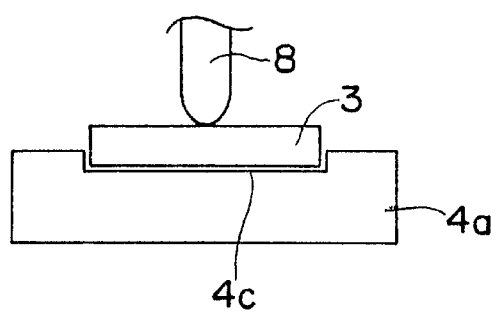

FIGS. 11A and 11B show an example (first example) where a substrate support 4a having a recess 4c for fastening the substrate 3 is used and the substrate 3 is fitted in the recess 4c.

In the first example, bumps 3a that make contact with the inner surfaces of the substrate supports 4a are formed at the bottom of the substrate 3, thereby to cause the substrate 3 fastened more firmly.

With the constitution described above comprising the substrate support 4a and the substrate 3 having the bumps 3a, the substrate 3 can be fastened more firmly without hampering the bending of the substrate 3 by the load.

Figure 11C:
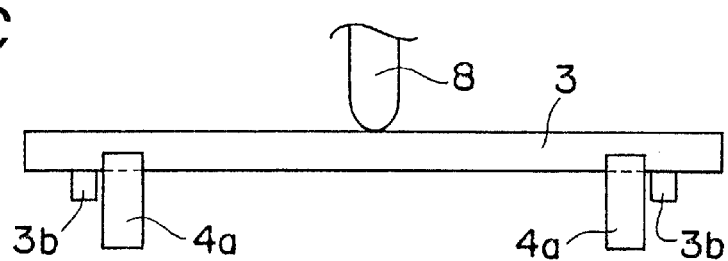
FIGS. 11C and 11D are illustrations showing another example (second example) where substrate supports having recesses are used.
Figure 11D:
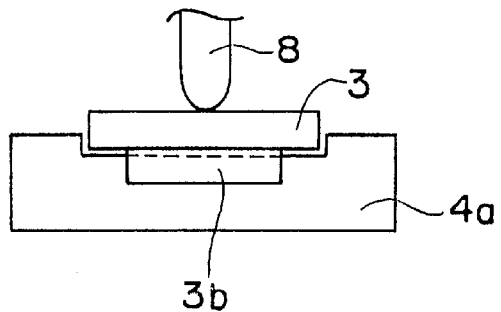

FIGS. 11C and 11D show another example (second example) where the substrate supports 4a having the recesses 4c are used. In the second example, bumps 3b that make contact with the outer surfaces of the substrate supports 4a are s formed at the bottom of the substrate 3, thereby to cause the substrate 3 to be fastened more firmly.

With the constitution described above comprising the substrate supports 4a and the substrate 3 having the bumps 3b, too, the substrate 3 can be fastened more firmly without hampering the bending of the substrate 3 by the load.

Figure 12A:
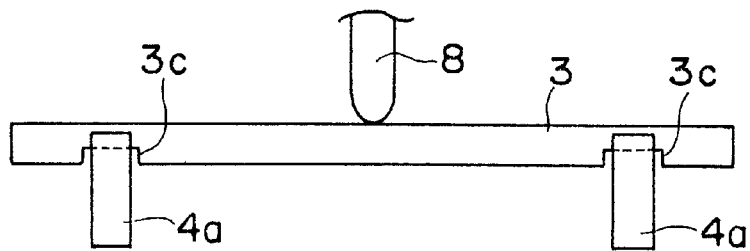
FIGS. 12A and 12B are illustrations showing another example (third example) where substrate supports having recesses are used.
Figure 12B:
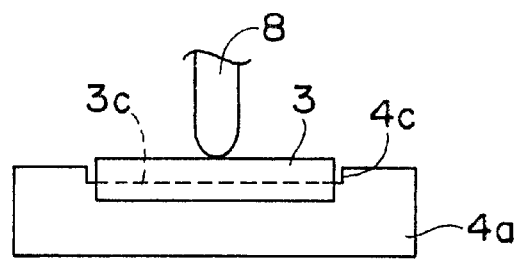

FIGS. 12A and 12B show another example (third example) where the substrate supports 4a having the recesses 4c are used, similarly to FIG. 11. In the third example, grooves 3c that fit in the recess of the substrate supports 4a are formed at the bottom of the substrate 3, thereby to cause the substrate 3 to be fastened more firmly.

With the constitution described above that comprises the substrate supports 4a and the substrate 3 having the grooves 3c, too, the substrate 3 can be fastened more firmly without hampering the bending of the substrate 3 by the load.

Figure 12C:
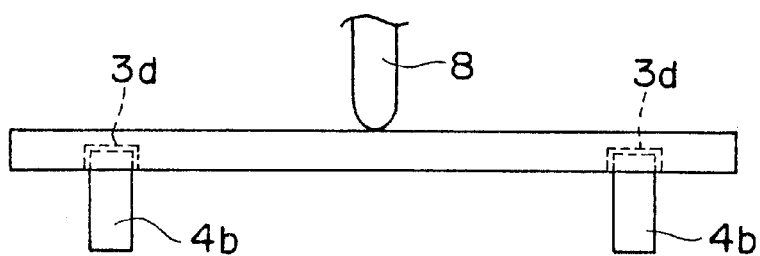
FIGS. 12C and 12D are illustrations showing an example where the substrate is supported by substrate supports with grooves, at the bottom of the substrate and closed at both ends of the substrate.
Figure 12D:
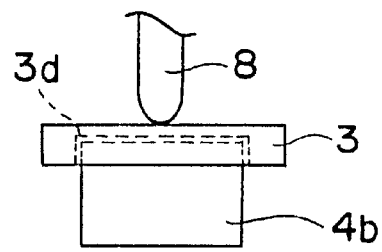

Further, FIGS. 12C and 12D show an example where the substrate 3 is supported by substrate supports 4b by forming grooves 3d, at the bottom of the substrate 3, that is closed at both ends of the substrate 3 and fitting the grooves 3d with the substrate supports 4b.

With this configuration, too, the substrate 3 can be fastened more firmly without hampering the bending of the substrate 3 by the load, as in the cases of the first through third examples.

The band pass filter (waveguide grating device) of the first embodiment constituted as described above allows it to easily adjust the Bragg wavelength of the band pass filter at the last stage of the production (at a time assembling has been completed), and makes it possible to improve the yield of production and reduce the cost.

The band pass filter of the first embodiment makes it possible to obtain a large change in the Bragg wavelength per load by applying a load to the substrate without bonding the substrate to the substrate supports and makes it possible to improve the yield of production and reduce the cost.

The fixing structure showing in FIGS. 11 and 12 makes it possible to fix the substrate securely in the casing and make it possible to improve the reliability such as vibration strength.

The fixing structure showing in FIGS. 11 and 12 can be applied in another embodiments of the present invention and make it possible to improve the reliability such as vibration strength.

Embodiment 2

The waveguide grating device according to the second embodiment of the present invention has such a constitution as the stress adjusting screw 8 for adjusting the Bragg wavelength of the waveguide grating 2 in the band pass filter (BPF) of the first embodiment is made of a material that has a predetermined thermal expansion coefficient, so that the change in the Bragg wavelength with temperature can be compensated for by changing the stress applied to the waveguide grating 2 in accordance to the change in the ambient temperature. The band pass filter of the second embodiment is constituted similarly to the first embodiment, except for the modification described above.

Specifically, when temperature characteristic of the Bragg wavelength without temperature compensation is as shown in FIG. 3, such materials are selected for the stress adjusting screw 8 and the substrate support body 4 as the thermal expansion coefficients thereof are larger than that of the casing 7 in order to compensate for the temperature characteristic. With this configuration, since the stress adjusting screw 8 and the substrate support body 4 expand more than the casing 7 as the temperature rises, greater stress is generated in the portion of the substrate where the waveguide grating 2 is formed to decrease the Bragg wavelength as shown in FIG. 2A thereby compensating for the temperature characteristic. In the second embodiment, polystyrene may be used for the materials to make the stress adjusting screw 8 and the substrate support body 4 and aluminum may be used for the casing 7.

An example of the band pass filter according to the second embodiment where polystyrene is used for the materials of the. stress adjusting screw 8 and the substrate support body 4, and aluminum is used for the casing 7 will be described below.

In this example, the Bragg wavelength before applying stress was 1545.2 nm in contrast to the desired Bragg wavelength of 1545.0 nm at room temperature. Since the Bragg wavelength was larger than the desired value by 0.2 nm, the substrate was set in the casing 7 with the surface where the waveguide was formed facing upward. Then the Bragg wavelength was adjusted to 1545.0 nm by turning the stress adjusting screw 8 while observing the Bragg wavelength with the temperature of a thermostat 14 being set to 24° C. in the optical measurement system shown in FIG. 13.

Then the Bragg wavelength was measured while changing the temperature of the thermostat. The measurement showed that changing rate of the Bragg wavelength with the temperature was 0.002 nm/° C. in a range from 10° C. to 80° C., that was one fifth that of the prior art.

The band pass filter of the second embodiment constituted as described above is capable of improving the temperature characteristic further, in addition to the effects of the first embodiment.

Embodiment 3

The band pass filter of the third embodiment has constitution similar to the band pass filter of the second embodiment, except that the substrate 3 is supported on the substrate support bodies 4 so that the surface whereon the waveguide 1 is formed faces downward (opposite to the stress adjusting screw 8).

With this configuration, when the Bragg wavelength of the waveguide grating 2 is smaller than the desired value, the Bragg wavelength can be increased and adjusted to the desired value by applying a bending stress with the stress adjusting screw 8.

In the constitution of the third embodiment, temperature characteristic of the Bragg wavelength without temperature compensation is as shown in FIG. 3, In order to compensate for the temperature characteristic, such materials are selected for the stress adjusting screw 8 and the substrate support body 4 as the thermal expansion coefficients thereof are smaller than that of the casing 7. With this configuration, as side faces of the casing 7 expand, the stress applied to the waveguide decreases thereby decreasing the Bragg wavelength as shown in FIG. 2B thus compensating for the temperature characteristic. In the third embodiment, polystyrene may be used for the materials to make the casing 7 and aluminum may be used for the screw 8 and the substrate support body 4. Specifically, the casing 7 as a whole may be made of polystyrene, or only the side wall of the casing may be made of a material of a large thermal expansion coefficient such as polystyrene.

Now an example of the third embodiment will be described below.

In this example, the Bragg wavelength before applying stress was 1556.2 nm, 0.3 nm smaller than the desired Bragg wavelength of 1556.5 nm at room temperature. Thus the substrate 3 was disposed in the casing 7 with the surface where the waveguide was formed facing downward. Then the Bragg wavelength was adjusted to 1556.5 nm by turning the stress adjusting screw 8 while observing the Bragg wavelength with the temperature of a thermostat being set to 25° C. in the optical measurement system shown in FIG. 13. The Bragg wavelength was then measured while changing the temperature of the thermostat. The measurement showed that the changing rate of the Bragg wavelength with the temperature was 0.002 nm/° C. in a range from −20° C. to 50° C., that was one fifth that of the prior art.

As described above, the band pass filter of the third embodiment has similar effect as that of the second embodiment.

Embodiment 4

Figure 14:
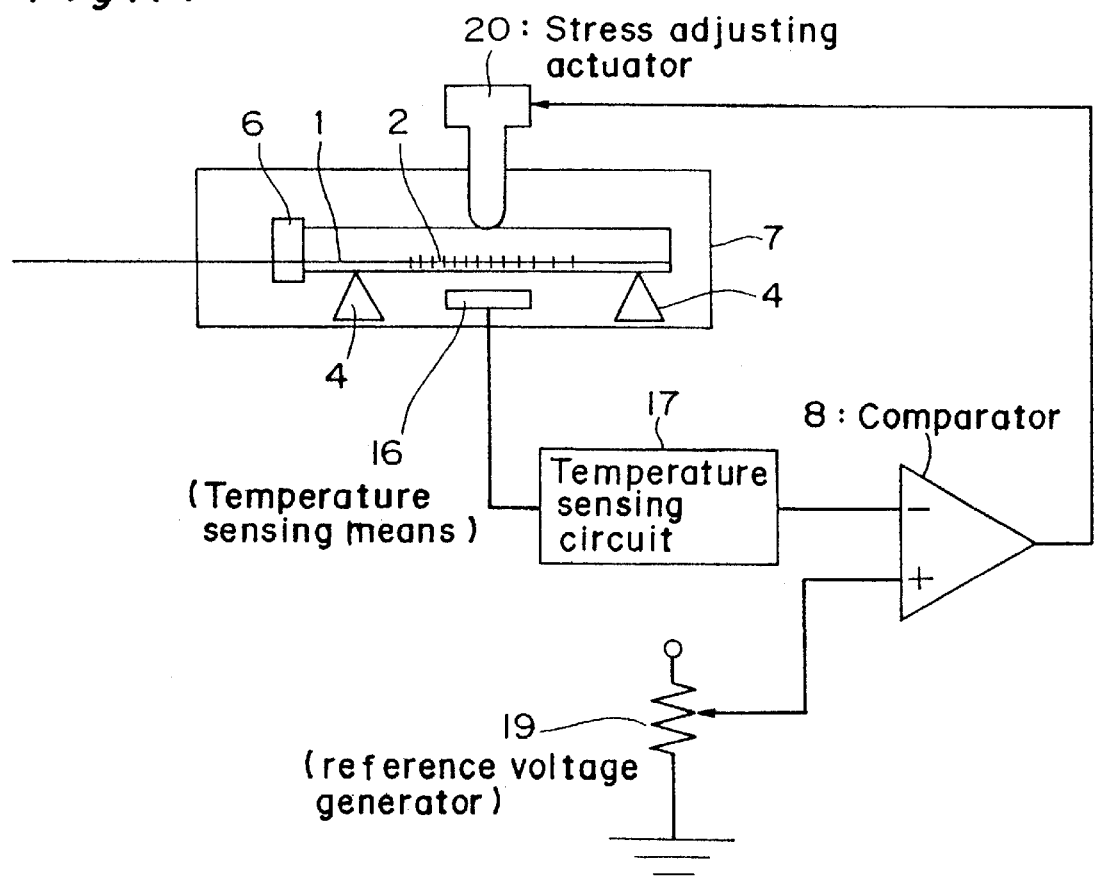
FIG. 14 is a side view schematically showing the constitution of the fourth embodiment of the present invention.

The band pass filter of the fourth embodiment is constituted similarly to the first embodiment, except for the differences described below from the band pass filter of the first embodiment, as shown in FIG. 14.

Differences from First Embodiment (1) The substrate 3 is supported onto the substrate support bodies 4 so that the surface whereon the waveguide 1 is formed makes contact with the substrate support bodies 4.

(2) Instead of the stress adjusting screw 8 of the first embodiment, a stress adjusting actuator 20 connected to an output terminal of a comparator 18 to be described later.

(3) A stress control circuit is provided that comprises a temperature sensor element 16 installed in the vicinity of the waveguide grating 2 in the casing 7, a temperature sensing circuit 17 consisting of a thermistor or a semiconductor device, for example, connected to the sensor element 16, and the comparator 18 with a negative input terminal thereof being connected to an output terminal of the temperature sensing circuit 17 and a positive input terminal being connected to a reference voltage generator 19.

The band pass filter of the fourth embodiment constituted as described above is capable of applying a stress to the waveguide grating 2 by means of the actuator 20, thus making it possible, not only to adjust the Bragg wavelength to a desired value, but also change the bending stress applied to the waveguide grating 2 as the temperature changes and compensate for changes in the Bragg wavelength caused by the temperature changes.

Now the operation of the stress control circuit according to the fourth embodiment will be described below.

The temperature sensing circuit 17 converts the temperature detected by the temperature sensing means 16 to a voltage and feeds the voltage to the negative input terminal of the comparator 18. The reference voltage generator 19 feeds a reference voltage to the positive input terminal of the comparator 18. The comparator 18 compares the voltage input from the temperature sensing circuit 17 and the reference voltage, and feeds a difference signal to the actuator 20. Thus the actuator 20 is controlled so as to compensate for the temperature change in the Bragg wavelength of the grating according to the ambient temperature of the waveguide grating 2.

An example of the band pass filter according to the fourth embodiment will be described below.

First, the band pass filter having the constitution shown in FIG. 14 was fabricated. The Bragg wavelength before applying stress was 1554.7 nm, that was 0.4 nm smaller than the desired Bragg wavelength of 1555.1 nm. Therefore the substrate was set in the casing 7 with the surface where the waveguide 1 was formed facing downward. Then the Bragg wavelength was adjusted by changing the voltage of the reference voltage generator 19 while observing the Bragg wavelength with the temperature of a thermostat 14 being set to 25° C. with the optical measurement system shown in FIG. 13. Adjusted Bragg wavelength was 1555.1 nm.

Then the Bragg wavelength was measured while changing the temperature setting of the thermostat 14. The measurement showed that changing rate of the Bragg wavelength with the temperature was 0.001 nm/° C., that was one tenth that of the prior art.

As described above, the band pass filter of the fourth embodiment was verified to be capable of easily controlling the Bragg wavelength and effective in improving the temperature characteristic.

Embodiment 5

Figure 15A:
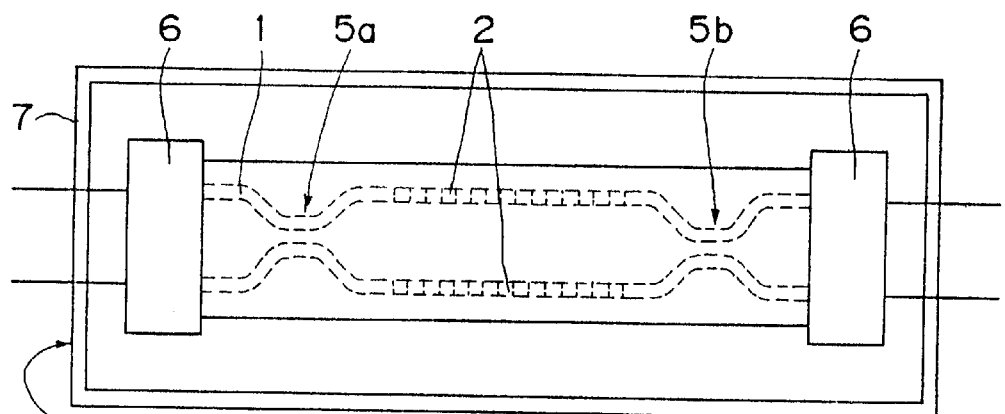
FIGS. 15A and 15B are schematic diagrams showing the constitution of the fifth embodiment of the present invention, FIG. 15A showing a plan view from above and FIG. 15B showing a side view.
Figure 15B:
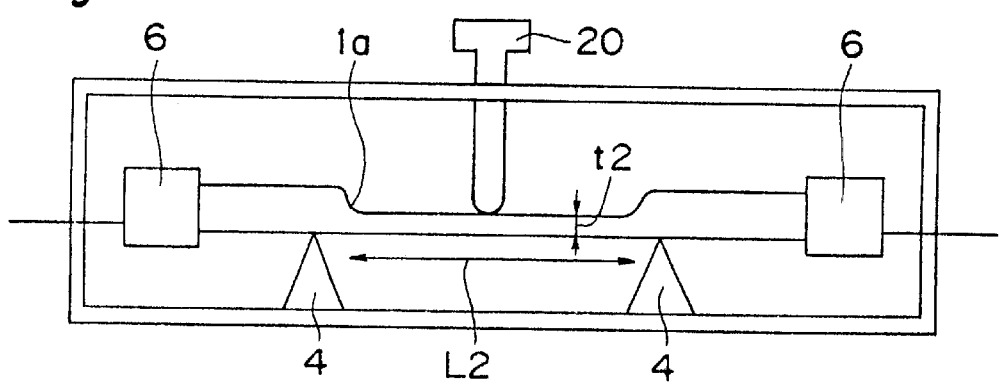

FIG. 15 shows a plan view (15A) and a sectional view (15B) of a waveguide grating device according to the fifth embodiment of the present invention. The waveguide grating device of the fifth embodiment has a function of wavelength-adjustable multiplexer/demultiplexer.

According to the fifth embodiment, first, a pair of waveguides 1 are formed symmetrically on the substrate 3.

The waveguides 1 are formed to come nearer to each other to form necks at two points that are spaced by a predetermined distance, thus forming the 3 dB couplers 5a, 5b from the necks.

Waveguide gratings 2 are formed in the waveguides 1 between the 3 dB couplers 5a, 5b. The waveguides 1 are connected to fiber array connectors 6 at both ends of the substrate 3.

The substrate 3 with the waveguides 1, the 3 dB couplers 5a, 5b and the waveguide gratings 2 formed thereon is supported on the substrate support bodies that are installed at a predetermined spacing from each other on the bottom of the casing 7.

In the fifth embodiment, portion of the substrate where the waveguide gratings 2 are formed is made thinner by polishing, as shown in FIG. 15A, so as to bend with a relatively small force. According to our research, the substrate 3 can be bent effectively with a relatively small force when setting the length L2 of the polished region in longitudinal direction of waveguide and the substrate thickness t2 so as to satisfy a relationship of t2/L2<0.5, thereby restraining the changes in Bragg wavelength with the voltage applied to the stress adjusting actuator 20 within a practical range.

Figure 20:
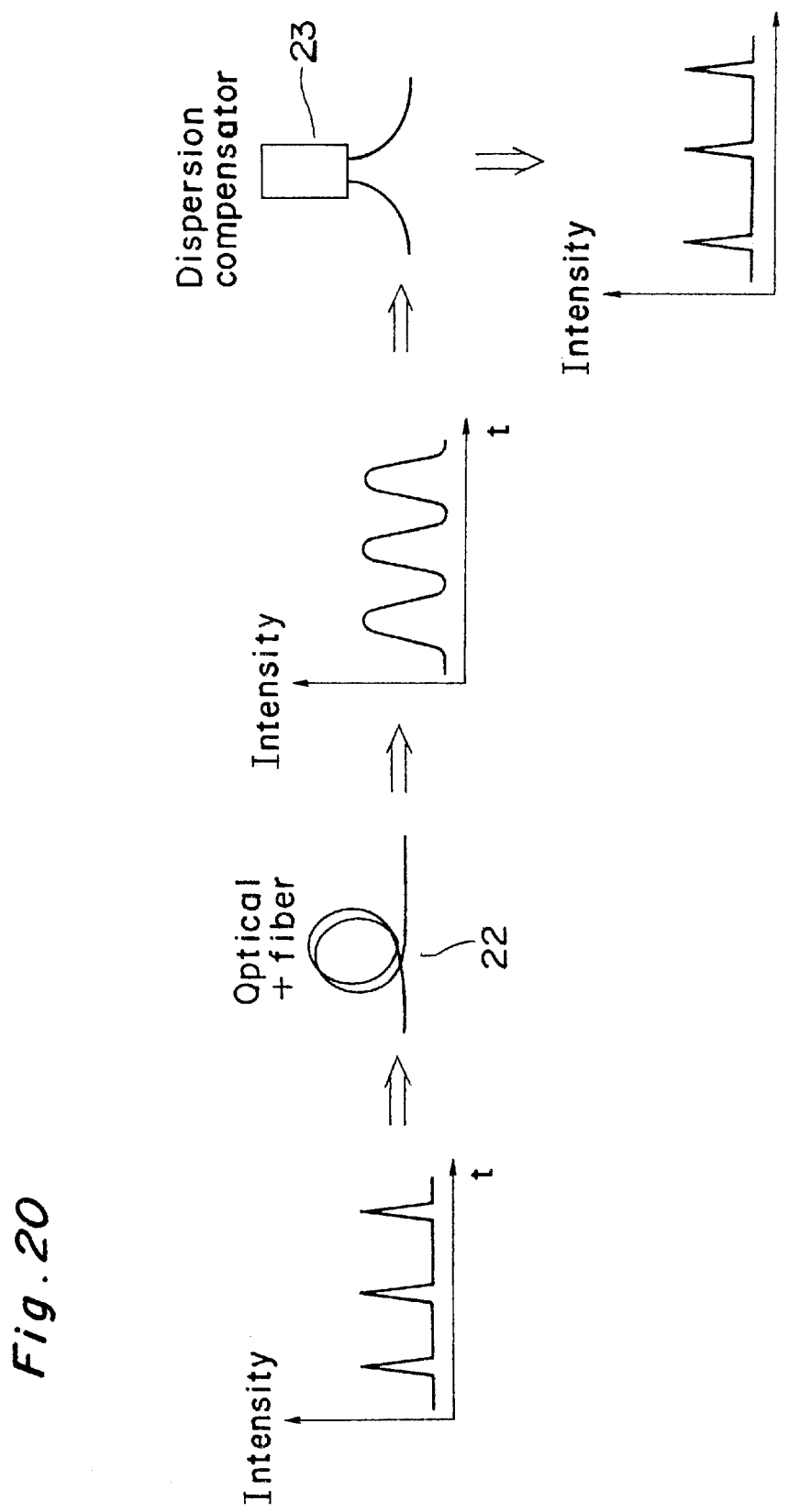
FIG. 20 is a diagram for explaining the function of the dispersion compensator of the seventh embodiment.

The smaller the ratio t2/L2, the steeper the changes in Bragg wavelength with the voltage as shown in FIG. 20. When t2 is made too small, however, sufficient mechanical strength cannot be maintained and the substrate 3 will be broken when such a stress is applied as the Bragg wavelength changes by several nanometers. Thus thickness of the substrate to be obtained after polishing is set to an optimum value by taking into consideration the required shift in the Bragg wavelength and the mechanical strength of the substrate 3.

In the wavelength-adjustable multiplexer/demultiplexer that is a waveguide grating device 72 of the fifth embodiment that is constituted as described above, signals of several wavelengths ($\lambda1, \lambda2, \lambda3, \ldots$) are fed to the port P1. Only the signal light that has a particular wavelength ($\lambda n$) given by formula (1) is reflected on the waveguide grating 2 and is output from the port P2, with other signal light of different wavelengths being output from the port P4. The signal light of a particular wavelength ($\lambda n$) that is input through the port P3 is reflected on the waveguide grating 2 and is output from the port P4.

Figure 16:
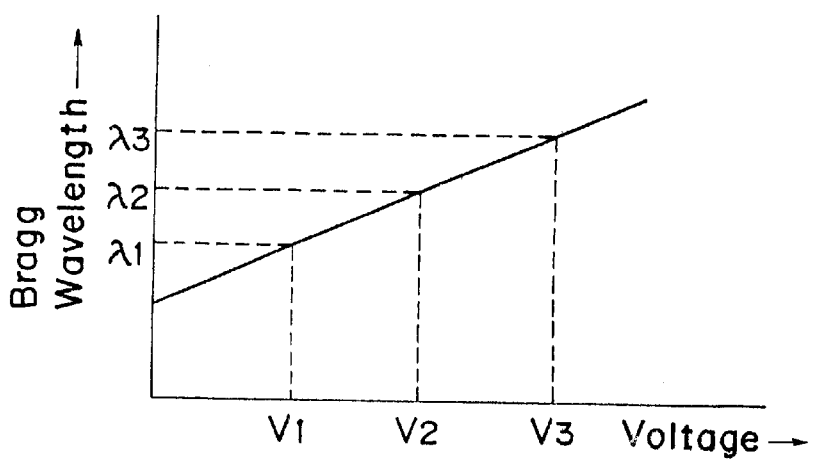
FIG. 16 is a graph showing the Bragg wavelength while changing the voltage in the fourth embodiment.
Figure 17A:
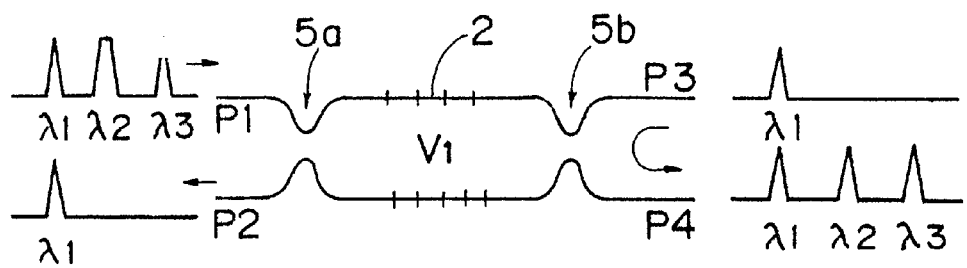
FIGS. 17A and 17B show the waveform of light pulse outputs from the ports in the waveguide grating device of the fourth embodiment.
Figure 17B:
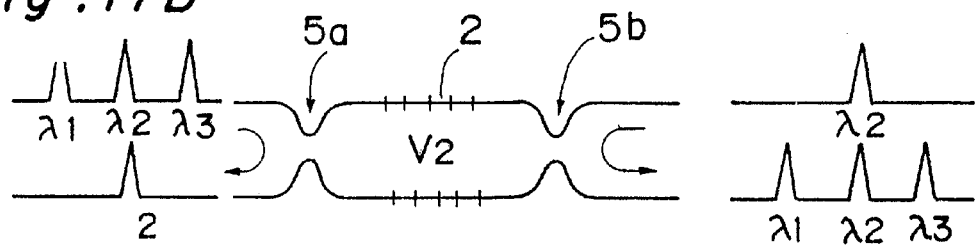
Figure 18:
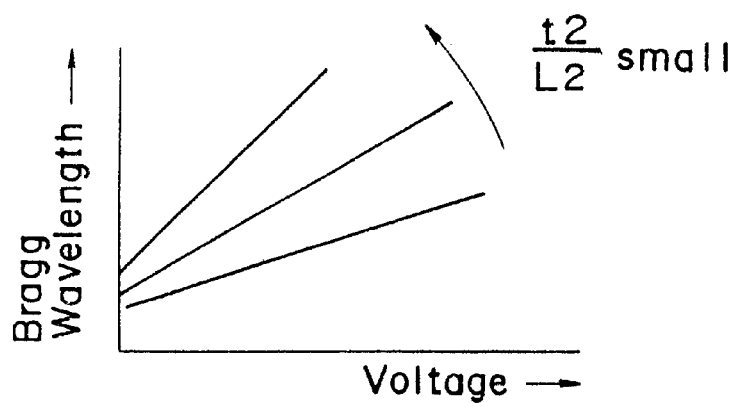
FIG. 18 is a graph showing the Bragg wavelength versus voltage when the ratio of thickness to width is changed.
Figure 19A:
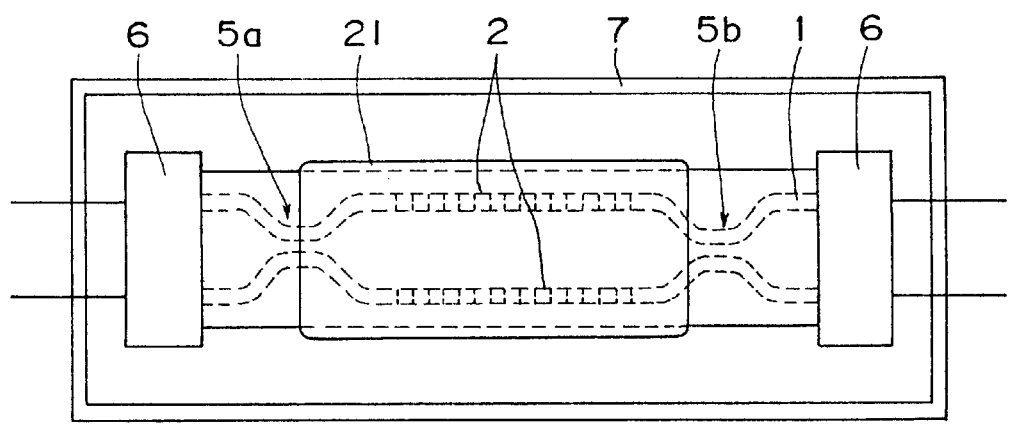
FIGS. 19A and 19B are schematic diagrams showing the constitution of the sixth embodiment of the present invention, FIG. 19A showing a plan view from above and FIG. 19B showing a side view.
Figure 19B:
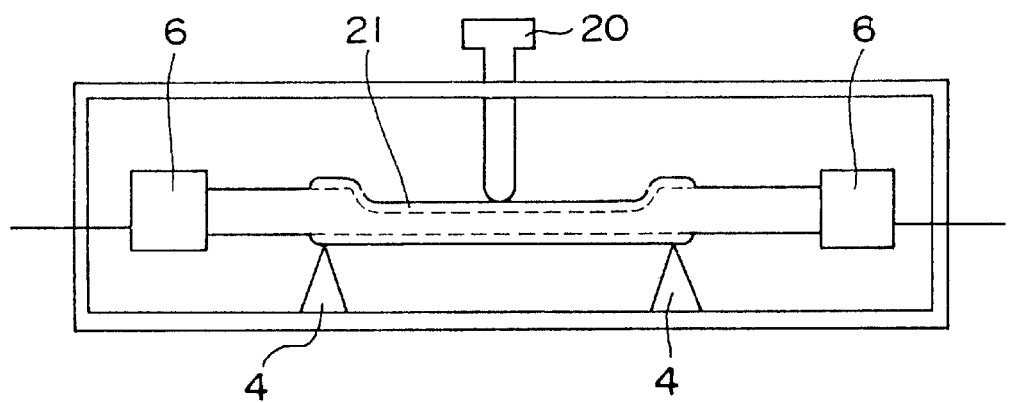

The wavelength-adjustable multiplexer/demultiplexer of the fifth embodiment, in particular, has such a feature that the Bragg wavelength of the waveguide grating 2 can be selected freely with the actuator 20. That is, a bending stress is applied to the waveguide grating 2 by applying a voltage to the actuator 20, thereby increasing the grating period so that the Bragg wavelength changes according to the formula (1). Since the Bragg wavelength changes with voltage as shown in FIG. 16, wavelength to be synthesized and divided can be selected freely by changing the voltage. Specifically, light signal having wavelength of $\lambda1$ can be synthesized and divided when the voltage is V1 as shown schematically in FIG. 17A and light signal having wavelength of $\lambda2$ can be synthesized and divided when the voltage is V2.

As an example of the fifth embodiment, such a device was fabricated as a region of the substrate where the waveguide grating 2 was formed was polished to a thickness t2 of 0.5 mm, with the length L2 of the polished region in longitudinal direction of waveguide and the substrate thickness t2 so as to satisfy a relationship of t2/L2=0.1.

Although the substrate 3 is thinned by polishing in the fifth embodiment, the present invention is not limited to this method and etching or other process may be employed for thinning.

Multiplexer/demultiplexers utilizing the waveguide grating s formed on the substrate of the prior art have been limited to those of fixed Bragg wavelengths. The fifth embodiment, by contrast, makes it possible to provide a multiplexer/demultiplexer that is capable of changing the Bragg wavelength by means of an actuator.

Embodiment 6

A multiplexer/demultiplexer of the sixth embodiment is constituted similarly to the fifth embodiment except for an organic material layer 21 that is formed on the portion of the multiplexer/demultiplexer of the fifth embodiment that is polished to be thinner, with the portion being increased in mechanical strength so that bending of the thinned substrate will not be hampered.

With this constitution in the sixth embodiment, such a device was fabricated as a region of the substrate where the waveguide grating 2 was formed was polished to a thickness t2 of 0.1 mm, with the length L2 of the polished region in longitudinal direction of waveguide and thickness t2 satisfy a relationship of t2/L2=0.01. Etching or other process may be employed instead of polishing for thinning the substrate. The organic material layer 21 may also be formed by applying polymethyl methacrylate (PMMA) or the like to a thickness of 0.5 mm on the side faces of the substrate as well as the surface thereof whereon the waveguide is formed by spin coating or a similar process and the surface opposite thereto.

Specifically, charge transfer type carbazole and solubilized phthalocyanine were dissolved in chloroform solution of PMMA, with the resultant solution being dripped onto the surface of the waveguide that was set in a spin coater. As the solution spreads into a thin film over the surface by the centrifugal force and the liquid evaporates, a PMMA film is formed.

The multiplexer/demultiplexer of the sixth embodiment, made in the process described above, is capable of changing the Bragg wavelength by applying a stress by means of the actuator 20 similarly to the fifth embodiment, and makes it possible to achieve a range of adjustment as wide as 20 nm since the substrate is made further thinner than that of the fifth embodiment and is coated with the organic material.

Embodiment 7

Figure 33:
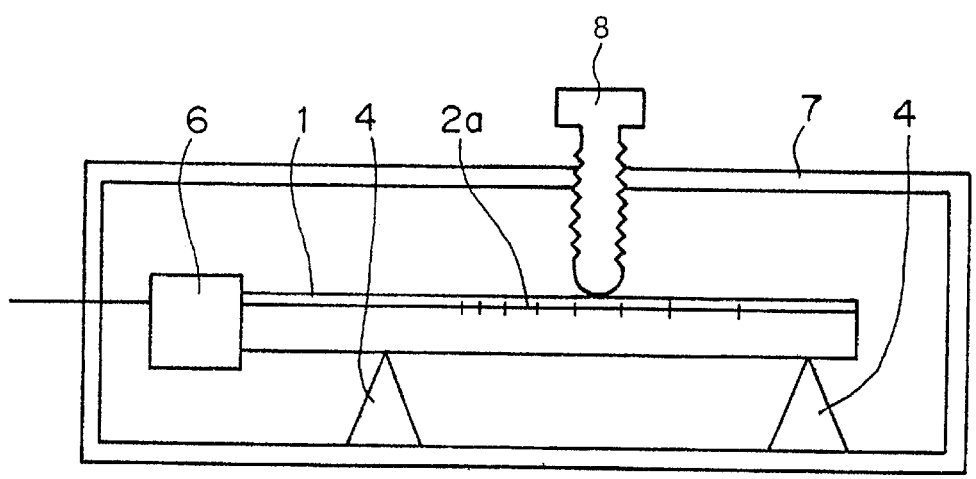
FIG. 33 is a side view showing the constitution of the dispersion compensator of the seventh embodiment.

A waveguide grating device of the seventh embodiment is constituted similarly to the first embodiment except for a waveguide grating 2a formed with gradually increasing grating period that is used instead of the waveguide grating 2 of the band pass filter of the first embodiment, to function as a dispersion compensator, as shown in FIG. 33.

In the dispersion compensator of the seventh embodiment constituted as described above, light that has entered the port P1 is divided by a 3 dB coupler into two parts. Light that has the Bragg wavelength $\lambda B$ of the waveguide grating 2a, namely signal light, is reflected on the waveguide grating 2a and synthesized in the 3 dB coupler, thereby being output from the port P2. Particularly in the dispersion compensator, since the period of the waveguide grating is set to increase with the distance from the input port in order to obtain positive dispersion that cancels negative dispersion due to the optical fiber, dispersion characteristic corresponding to the change in the waveguide grating is provided.

Figure 29A:
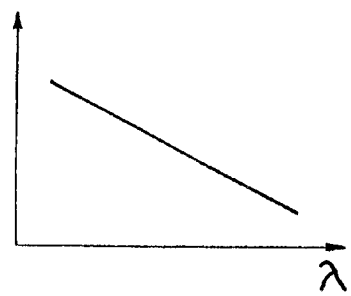
FIG. 29A is a graph showing group delay versus wavelength.
Figure 29B:
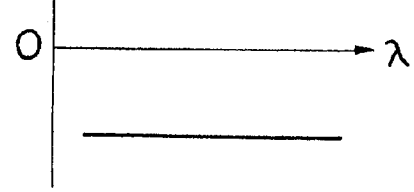
FIG. 29B is a graph showing dispersion versus wavelength for explaining the operation of the dispersion compensator.
Figure 30A:
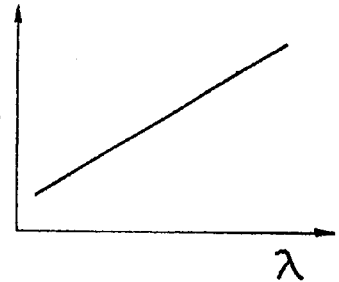
FIG. 30A is a graph showing group delay versus wavelength.
Figure 30B:
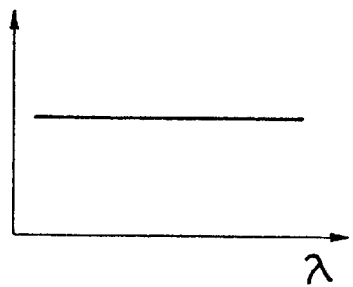
FIG. 30B is a graph showing dispersion versus wavelength for explaining the operation of the dispersion compensator having different characteristic from that of FIG. 29.
Figure 31:
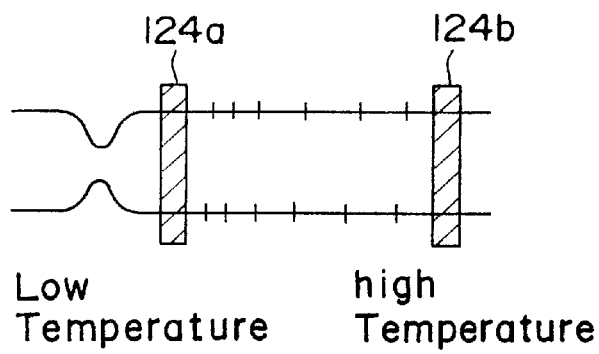
FIG. 31 is a schematic diagram showing the constitution of the dispersion compensator that is capable of changing the amount of dispersion.
Figure 32A:
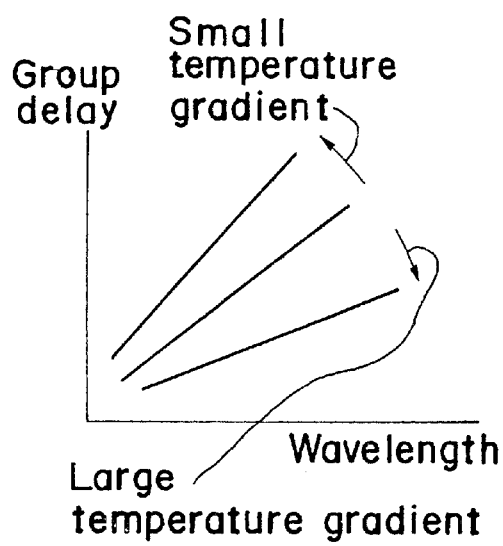
FIGS. 32A, 32B and 32C are graphs for explaining the operation of the dispersion compensator that is capable of changing the amount of dispersion.
Figure 32B:
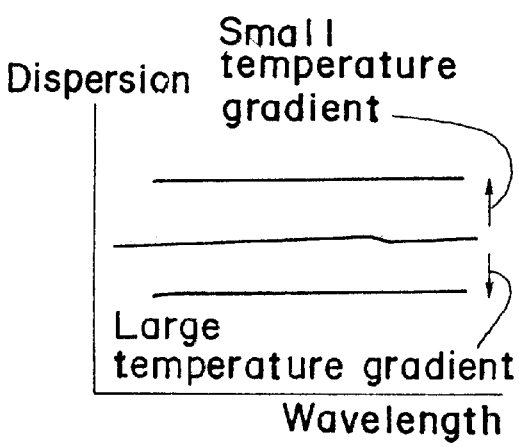
Figure 32C:
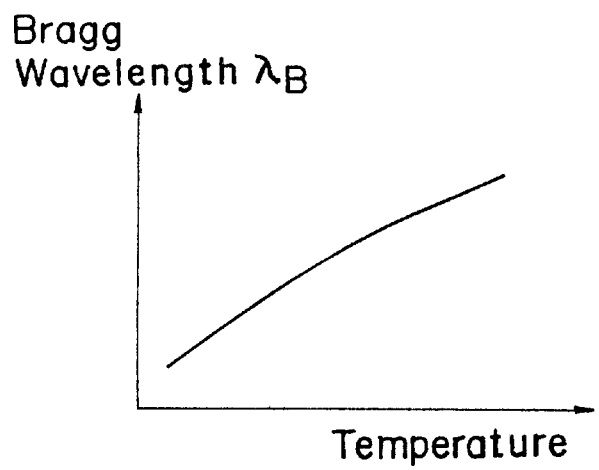

Specifically, since the optical pulse signal transmitted over the optical fiber has somewhat spread bandwidth around the center of $\lambda B$, an optical pulse signal having such a waveform as shown in FIG. 20A before propagation is spread over time as shown in FIG. 20B after propagating over several tens of kilometers along the optical fiber, due to the dispersion of the optical fiber. In order to correct this, the dispersion compensator has positive dispersion in contrast to the negative dispersion of the optical fiber as shown in FIGS. 29A, 29B while the grating period is increased with the distance from the input port so that the dispersions of both components cancel each other.

With this configuration, the optical pulse signal that has spread after propagating over several tens of kilometers along the optical fiber is corrected to the original waveform prior to the propagation by passing through the dispersion compensator as shown in FIG. 20C.

The dispersion compensator of the seventh embodiment is made in such a constitution as a stress can be applied to the waveguide grating 2 by means of the screw 8, and is capable of adjusting the Bragg wavelength to a desired value. In this embodiment, the substrate is set with the surface thereof whereon the waveguide is formed makes contact with the stress adjusting screw 8, with the stress adjusting screw 8, the substrate support body 4 and the casing 7 have appropriate thermal expansion coefficients so that the stress applied to the waveguide grating 2 as the ambient temperature changes, thereby compensating for the shift in the Bragg wavelength with temperature.

Temperature characteristic of the Bragg wavelength without temperature compensation is as shown in FIG. 3, In order to compensate for the temperature characteristic, such materials are selected for the stress adjusting screw 8 and the substrate support body 4 as the thermal expansion coefficients thereof are smaller than that of the casing 7. With this configuration, as the stress adjusting screw 8 and the substrate support body 4 expand with temperature increase, the stress applied to the waveguide grating 2 increases thereby decreasing the Bragg wavelength as shown in FIG. 2A thus compensating for the temperature characteristic.

An example of the seventh embodiment was made by using aluminum is used for the casing 7 and polystyrene for the screw 8 and the substrate support body 4.

In this example, since the Bragg wavelength before applying stress was 1552.0 nm, that was 1.0 nm larger than the desired Bragg wavelength of 1551.0 nm at room temperature, the substrate was set in the casing with the waveguide surface facing toward the screw. Then the Bragg wavelength was adjusted to 1551.0 nm by turning the screw while observing the Bragg wavelength while setting the temperature of a thermostat 14 to 25° C., with the optical measurement system shown in FIG. 13. In the adjustment, a precision as high as ±0.01 nm was achieved.

In the prior art, it has been difficult to produce a dispersion compensator having predetermined Bragg wavelength. According to the seventh embodiment, however, it is made possible to very easily adjust the Bragg wavelength of the dispersion compensator that has been produced, thus improving the production yield and reducing the cost. It has been also verified that the present invention is effective in improving the temperature characteristic.

Embodiment 8

Figure 21:
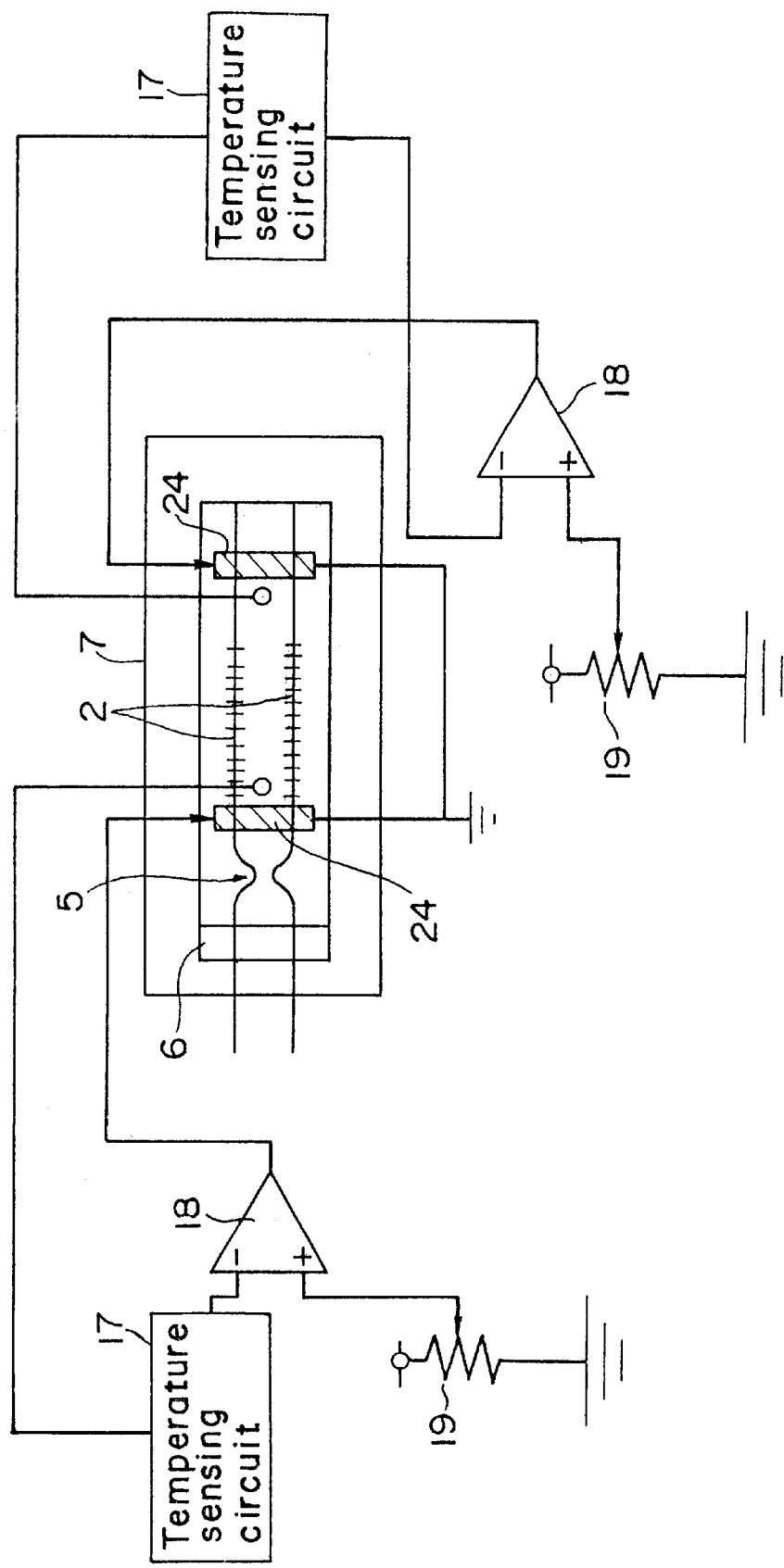
FIG. 21 is a schematic block diagram for explaining the dispersion characteristic of the variable dispersion compensator of the eighth embodiment.
Figure 22:
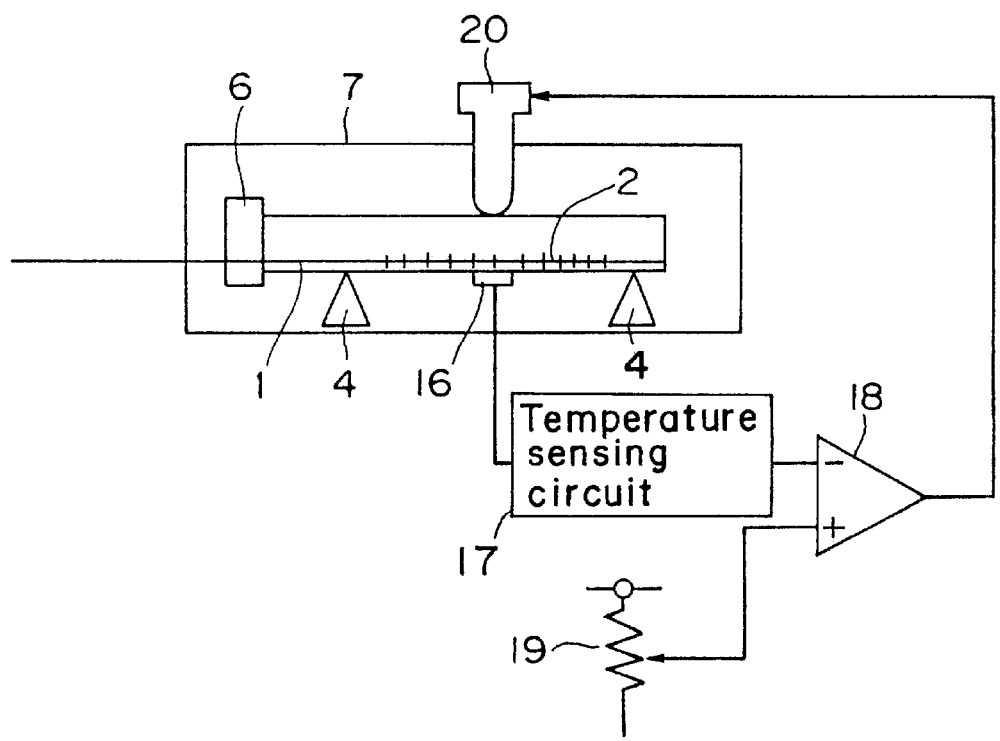
FIG. 22 is a schematic block diagram for explaining the adjustment of the Bragg wavelength of the variable dispersion compensator and temperature characteristic method of the eighth embodiment.
Figure 23A:
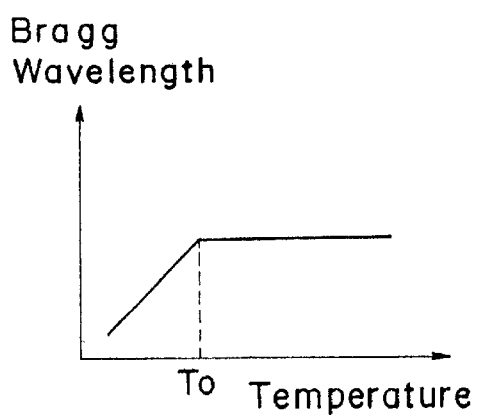
FIGS. 23A and 23B are graphs showing the Bragg wavelength versus temperature for explaining the operation of the eighth embodiment.
Figure 23B:
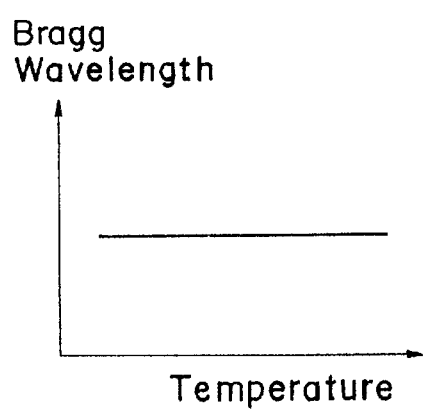

A waveguide grating device of the eighth embodiment of the present invention is a variable dispersion compensator. FIG. 21 is a schematic block diagram showing the constitution of changing the dispersion characteristic of the variable dispersion compensator. FIG. 22 is a schematic block diagram showing a method of adjusting the Bragg wavelength of the variable characteristic.

The variable dispersion compensator of the eighth embodiment is constituted similarly to the variable dispersion compensator of the seventh embodiment except for following points:

(1) heating means 24 that generated temperature gradient in the waveguide gratings 2 that are formed on both sides of the waveguide grating device 2 shown in FIG. 21 and a heat gradient control circuit comprising a temperature sensing circuit 17, a reference voltage generator 19 and a comparator 18 connected to the heating means;

(2) the stress adjusting actuator 20 connected to the output terminal of the comparator 18 is used instead of the stress adjusting screw 8 of the seventh embodiment; and (3) a stress control circuit is provided that comprises the temperature sensing element 16 installed near the waveguide grating 2 in the casing 7, the temperature sensing circuit 17 consisting of a thermistor or a semiconductor device, for example, connected to the sensor element 16, and the comparator 18 with a negative input terminal thereof being connected to an output terminal of the temperature sensing circuit 17 and a positive input terminal being connected to the reference voltage generator 19.

The variable dispersion compensator of the eighth embodiment has, in addition to functions similar to those of the variable dispersion compensator of the seventh embodiment, such features as described below.

The amount of dispersion required of the dispersion compensator varies depending on the length and operating condition of the fiber. In the prior art, the optimum dispersion compensator has been determined by inserting a plurality of dispersion compensators of different amounts of dispersion successively, which requires much tedious labor. The variable dispersion compensator of the eighth embodiment, by contrast, eliminates the tedious task of selection.

The variable dispersion compensator of the eighth embodiment generates heat gradient in the waveguide grating 2 with the heating means 24 formed on both sides of the waveguide grating device 2 shown in FIG. 21 while using the temperature sensing circuit 17, a reference voltage generator 19 and a comparator 18 connected to the heating means, thereby setting the Bragg wavelength to a value corresponding to the temperature gradient.

The variable dispersion compensator of the eighth embodiment is capable of setting the required amount of dispersion by controlling the temperature gradient generated in the waveguide grating 2 according to the dispersion that varies depending on the length and operating condition of the fiber.

The variable dispersion compensator of this embodiment, being made in such a constitution as the stress can be applied to the waveguide grating by means of the actuator, is capable of adjusting the Bragg wavelength to a desired value.

The variable dispersion compensator is also made in such a constitution as the stress applied to the waveguide grating changes as the temperature of the grating at the center thereof changes, so that the shift in Bragg wavelength due to temperature change is compensated for when the dispersion is changed.

Temperature characteristic of the Bragg wavelength without temperature compensation is as shown in FIG. 3, In the stress control circuit that compensates for this temperature characteristic, temperature detected by the temperature sensing means 16 is converted to a voltage by the temperature sensing circuit 17, while this voltage and the reference voltage input from the reference voltage generator 19 are compared in the comparator 18. The actuator 20 is controlled according to the difference signal generated by the comparator 18.

In an example of the eighth embodiment, since the Bragg wavelength before applying stress was 1556.5 nm, that was 1.5 nm larger than the desired Bragg wavelength of 1555.0 nm at room temperature, the substrate was set in the casing with the waveguide surface facing toward the screw. Then the Bragg wavelength was adjusted by changing the voltage of the reference voltage generator 19 while observing the Bragg wavelength while setting the temperature of a thermostat 14 to 25° C., with the optical measurement system shown in FIG. 13. Reflection Bragg wavelength of 1555.0 nm was achieved after adjustment. In the adjustment by means of the actuator, a precision of Bragg wavelength as high as ±0.01 nm was achieved.

Figure 24A:
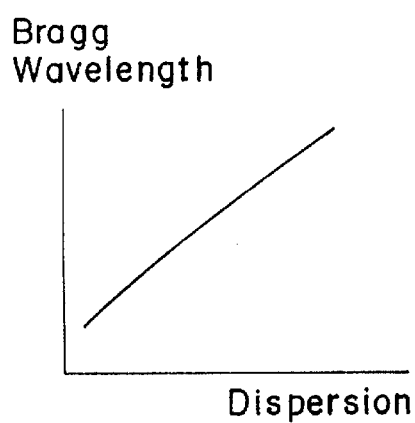
FIGS. 24A and 24B are graphs showing the Bragg wavelength versus dispersion for explaining the operation of the eighth embodiment.
Figure 24B:
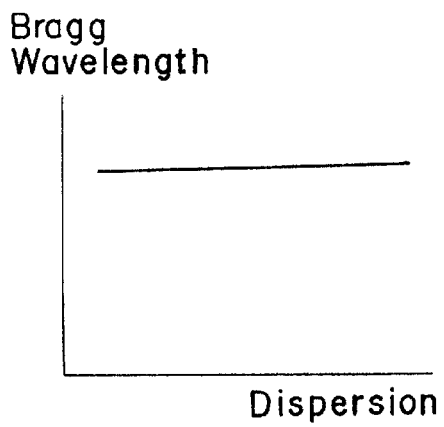
Figure 25:
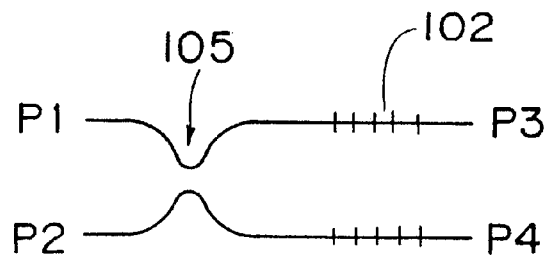
FIG. 25 is a schematic diagram showing the band pass filter that is one form of the waveguide grating device.
Figure 26:
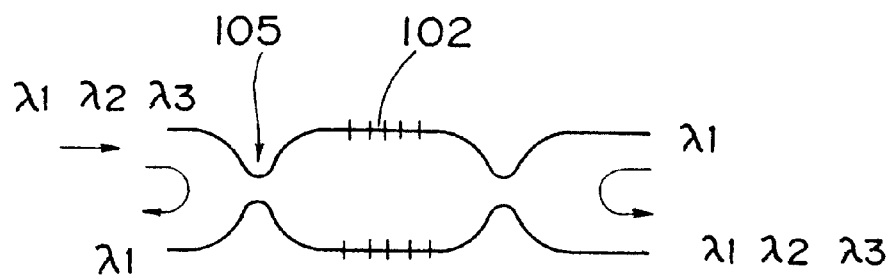
FIG. 26 is a schematic diagram showing the multiplexer/demultiplexer that is one form of the waveguide grating device.
Figure 27:
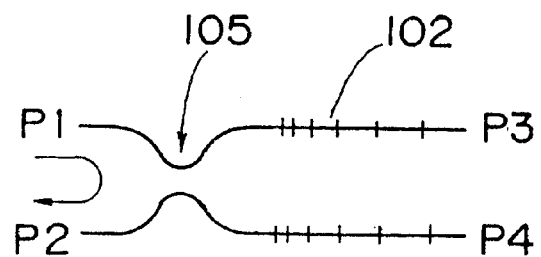
FIG. 27 is a schematic diagram showing the dispersion compensator that is one form of the waveguide grating device.
Figure 28A:
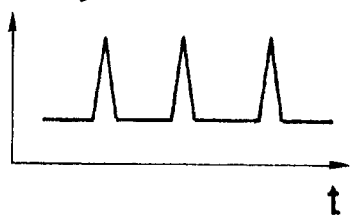
FIG. 28A is a diagram showing light pulse waveform before propagating over an optical fiber.
Figure 28B:
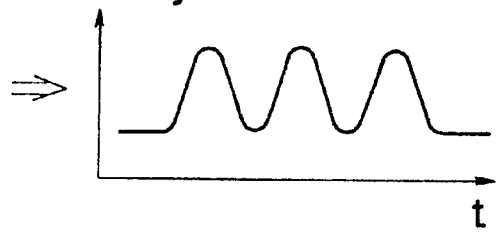
FIG. 28B is a diagram showing light pulse waveform after propagating over the optical fiber.

When the actuator 20 was fixed and the dispersion was changed by the temperature gradient, the Bragg wavelength changed as shown in FIG. 24A. When the actuator 20 was operated, the Bragg wavelength changed with the dispersion as shown in FIG. 24B, where change in the Bragg wavelength was suppressed.

As described above, while it has been difficult to produce a dispersion compensator having predetermined Bragg wavelength, constitution of the eighth embodiment makes it possible to very easily adjust the Bragg wavelength of the dispersion compensator that has been produced, thus improving the production yield and reducing the cost.

It has been also verified that the present invention is effective in stabilizing the Bragg wavelength when the dispersion changes Embodiment 9

Figure 34A:
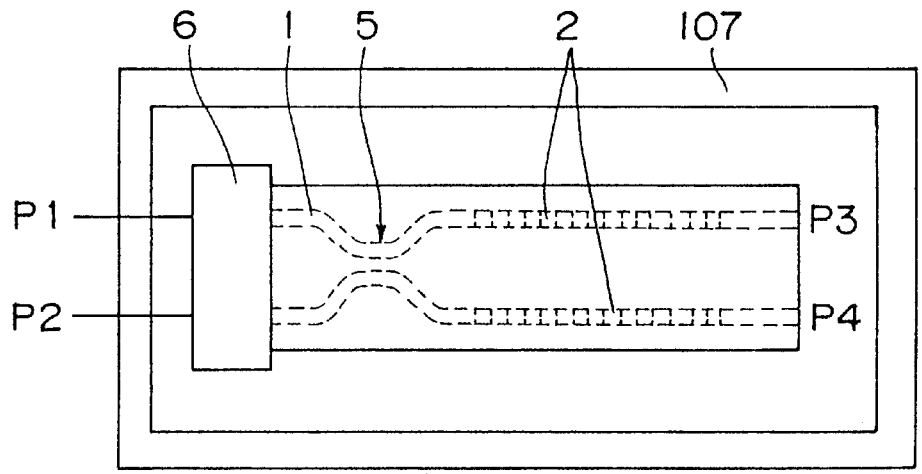
FIGS. 34A and 34B are schematic diagrams showing the constitution of the ninth embodiment of the present invention, FIG. 34A showing a plan view from above and FIG. 34B showing a side view.
Figure 34B:
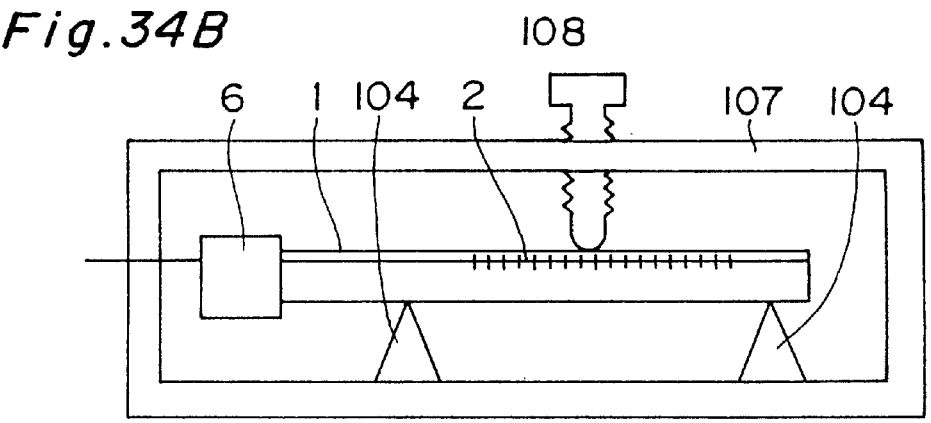

The waveguide grating device according to the ninth embodiment of the present invention is constituted similarly to the first embodiment, except for a casing 107, a stress adjusting screw 108 and substrate support bodies 104 are used instead of the casing 7, the stress adjusting screw 8 and the substrate support body 4 of the waveguide grating device (band pass filter) of the first embodiment, as shown in FIG. 34.

The waveguide grating device (band pass filter) of the ninth embodiment is characterized in that thermal expansion coefficients of the casing 107, the stress adjusting screw 108 and the substrate support body 104 are set so as to compensate for the change in Bragg wavelength of the waveguide grating 2 with the temperature.

Specifically, in the waveguide grating device of the ninth embodiment, the substrate is disposed so that the surface thereof whereon the waveguide grating 2 is formed opposes the stress adjusting screw 108, the stress adjusting screw 108 and the substrate support bodies 104 are formed from materials that have thermal expansion coefficients higher than that of the casing 107, and the dimensions of the stress adjusting screw 108, the substrate support bodies 104 and the casing 107 are set so as to compensate for the change in Bragg wavelength of the waveguide grating 2 with the temperature.

In the waveguide grating device of the ninth embodiment having the constitution as described above, since the stress adjusting screw 108 and the substrate support body 104 expand more than the casing 107 when the temperature rises, bending stress applied to the waveguide grating 2 increases thereby reducing the Bragg wavelength as shown in FIG. 2A.

This makes it possible to compensate for the temperature dependency of the Bragg wavelength (tendency of the Bragg wavelength to increase as the temperature rises) of the waveguide grating 2 shown in FIG. 3, so that the Bragg wavelength remains unchanged when the temperature changes as shown in FIG. 4.

In the waveguide grating device (band pass filter) of the ninth embodiment, the Bragg wavelength can be easily adjusted similarly to the first embodiment since tightening of the stress adjusting screw 108 causes a compressive force to be applied to the waveguide grating surface thereby decreasing the grating period, thus controlling the Bragg wavelength toward short wavelength side.

The waveguide grating device according to the ninth embodiment of the present invention, as described above has, in addition to the effect similar to that of the first embodiment, such an effect as improving the temperature characteristic further.

A specific example of the waveguide grating device of the ninth embodiment will be described below.

The present invention is not limited to the following specific example.

In the specific example, a band pass filter having a target Bragg wavelength of 1545.0 nm was fabricated by using the casing 107 made of Invar (thermal expansion coefficient $1\times10^{-6}$) measuring 50 mm in width, 20 mm in height and 20 mm in depth, the stress adjusting screw 108 and the substrate support body 104 both made of aluminum (thermal expansion coefficient $24\times10^{-6}$).

In this specific example, the Bragg wavelength before applying a stress was 1545.2 nm, that was 0.2 nm larger than the desired Bragg wavelength of 1545.0 nm at room temperature. The Bragg wavelength was adjusted to 1545.0 nm by turning the stress adjusting screw 108 while observing the Bragg wavelength and setting the temperature of a thermostat 14 to 25° C., in the optical system shown in FIG. 13.

Then the Bragg wavelength was measured while changing the temperature of the thermostat 14. The measurement showed that changing rate of the Bragg wavelength with the temperature was 0.002 nm/° C. in a range from 10° C. to 80° C., reduced to one fifth that of the prior art.

This specific example showed that the waveguide grating device according to the ninth embodiment is capable of easily controlling the Bragg wavelength and improving the temperature characteristic.

In the waveguide grating device of the ninth embodiment, the substrate is disposed so that the surface thereof whereon the waveguide grating 2 is formed opposes the stress adjusting screw 108, while the stress adjusting screw 108 and the substrate support bodies 104 are formed from materials that have thermal expansion coefficients higher than that of the casing 107, thereby to compensate for the change in Bragg wavelength of the waveguide grating 2 with the temperature.

However, the present invention is not limited to this constitution, and such a constitution may also be employed as the opposite side of the substrate opposes the stress adjusting screw 108, while the stress adjusting screw 108 and the substrate support bodies 104 are formed from materials that have thermal expansion coefficients lower than that of the casing 107, thereby to compensate for the change in Bragg wavelength of the waveguide grating 2 with the temperature.

When the substrate is set in the casing 107 so that the surface thereof whereon the waveguide grating 2 is formed opposes the stress adjusting screw 108, the Bragg wavelength of the waveguide grating 2 before applying the bending stress is made smaller than the desired Bragg wavelength, and is adjusted with the stress adjusting screw.

Embodiment 10

Figure 35:
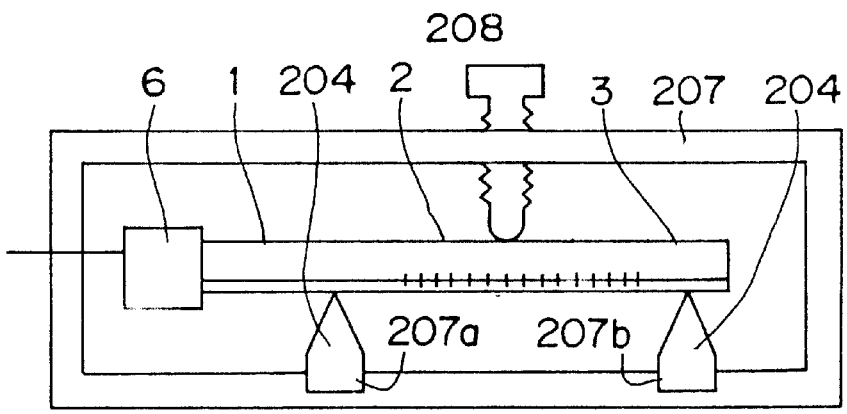
FIG. 35 is a side view schematically showing the constitution of the tenth embodiment of the present invention.

In the waveguide grating device according to the tenth embodiment of the present invention, the substrate 3 having the waveguide grating 2 formed thereon is installed in a casing 207 that have recesses 207a, 207b for embedding substrate support bodies 204 as shown in FIG. 35.

Components of the tenth embodiment similar to those used in the first embodiment will be denoted with like reference numerals.

In the waveguide grating device of the tenth embodiment, part of the substrate support bodies 204 are embedded in the recesses 207a, 207b, respectively, of the casing 207.

The substrate 3 with the waveguide grating 2 formed thereon is placed on the substrate support bodies 204 and supported thereto so that the surface of the waveguide grating 2 opposes the substrate support bodies 204.

The stress adjusting screw 208 is installed to make contact with the surface opposite to the surface whereon the waveguide grating 2 is formed.

In the waveguide grating device of the tenth embodiment, the stress adjusting screw 208 and the substrate support bodies 204 are formed from materials that have thermal expansion coefficients lower than that of the casing 207, thereby to compensate for the change in Bragg wavelength of the waveguide grating 2 with the temperature.

In the waveguide grating device (band pass filter) of the tenth embodiment, since the substrate 3 is installed with the surface whereon the waveguide grating 2 opposes the substrate support bodies 204, tightening of the stress adjusting screw 208 causes the substrate 3 so that tensile stress is generated in the waveguide grating surface. This increases the period of the waveguide grating 2 thereby shifting the Bragg wavelength toward long wavelength side.

In the tenth embodiment, since thermal expansion coefficients of the stress adjusting screw 208 and the substrate support bodies 204 are lower than that of the casing 207, the stress adjusting screw 208 and the substrate support body 204 expand more than the casing 207 when the temperature rises. Thus the bend of the substrate 3 becomes smaller and the period of the waveguide grating 2 decreases, thus making it possible to compensate for the change in Bragg wavelength of the waveguide grating 2 with the temperature.

As described above, the waveguide grating device of the tenth embodiment makes it easier to adjust the Bragg wavelength similar to the first embodiment, and improves the temperature characteristic (reduce the change in the Bragg wavelength with temperature).

Moreover, since the waveguide grating device of the tenth embodiment has such a constitution as the substrate support bodies 204 are embedded in the recesses 207a, 207b of the casing 207, profile of the casing can be lower than in the first embodiment and other.

A specific example of the waveguide grating device of the tenth embodiment will be described below.

The present invention is not limited to the following specific example.

In this specific example, a band pass filter having a target Bragg wavelength of 1545.0 nm was fabricated by using the casing 207 made of aluminum (thermal expansion coefficient $24 \times 10^{-6}$) measuring 50 mm in width, 15 mm in height and 20 mm in depth, the stress adjusting screw 208 and the substrate support body 204 both made of Invar (thermal expansion coefficient $1 \times 10^{-6}$).

In this specific example, the Bragg wavelength before applying a stress at room temperature was 1544.8 nm, that was 0.2 nm smaller than the desired Bragg wavelength of 1545.0 nm. The Bragg wavelength was adjusted to 1545.0 nm by turning the stress adjusting screw 208 while observing the Bragg wavelength and setting the temperature of the thermostat 14 to 25° C., in the optical system shown in FIG. 13.

Then the Bragg wavelength was measured while changing the temperature of the thermostat 14. The measurement showed that changing rate of the Bragg wavelength with the temperature was 0.002 nm/° C. in a range from 10° C. to 80° C., reduced to one fifth that of the prior art.

Because the substrate support bodies 204 are embedded in the casing 207, height of the casing could be made two thirds that of the specific example of the ninth embodiment.

Embodiment 11

Figure 36:
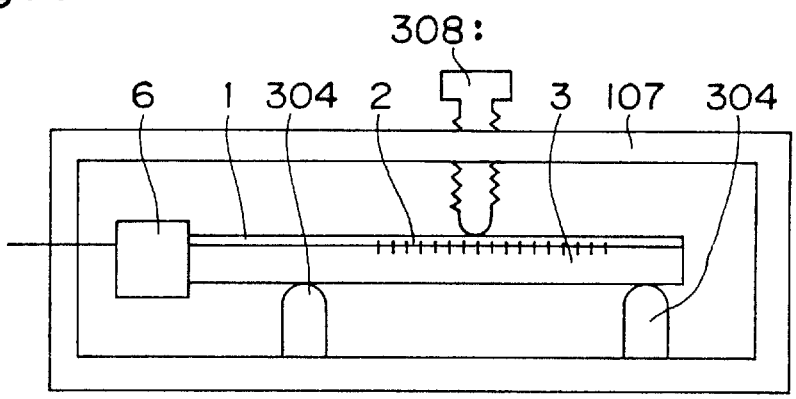
FIG. 36 is a side view schematically showing the constitution of the eleventh embodiment of the present invention.

The waveguide grating device according to the eleventh embodiment of the present invention is constituted similarly to the ninth embodiment, except for substrate support bodies 304 and a stress adjusting screw 308 are used instead of the substrate support body 104 and the stress adjusting screw 108 of the waveguide grating device (band pass filter) of the ninth embodiment, as shown in FIG. 36.

In the eleventh embodiment, end portions of the substrate support bodies 304 and the stress adjusting screw 308 that make contact with the substrate 3 are made in arc shape having radius of curvature, so that the substrate 3 is prevented from breaking when the substrate 3 is bent, thereby improving the reliability of the device.

The arc shape having radius of curvature refers to an arc shape of the substrate support body 304 that makes contact with the substrate 3 having center on an axis parallel to the substrate 3, and to the shape of the end portion of the stress adjusting screw 8 that is an arc shape having radius of curvature with center located on one point.

According to the present invention, end portion of the stress adjusting screw 8 may also be made in an arc shape having center on a straight line parallel to the substrate 3.

In the eleventh embodiment, similarly to the ninth embodiment, the substrate is disposed so that the surface thereof whereon the waveguide grating 2 is formed opposes the stress adjusting screw 308, the stress adjusting screw 308 and the substrate support bodies 304 are formed from materials that have thermal expansion coefficients higher than that of the casing 107, and the dimensions of the stress adjusting screw 308, the substrate support bodies 304 and the casing 107 are set so as to compensate for the change in Bragg wavelength of the waveguide grating 2 with the temperature.

The waveguide grating device according to the eleventh embodiment constituted as described above has, in addition to the effect similar to that of the waveguide grating device of the ninth embodiment, such an effect as improving the reliability of the device further.

A specific example of the waveguide grating device of the eleventh embodiment will be described below. The present invention is not limited to the following specific example.

In this specific example, a band pass filter having a target Bragg wavelength of 1545.0 nm was fabricated by using the casing 107 made of Invar (thermal expansion coefficient $1 \times 10^{-6}$) measuring 50 mm in width, 20 mm in height and 20 mm in depth, the stress adjusting screw 308 and the substrate support body 304 both made of aluminum (thermal expansion coefficient $24 \times 10^{-6}$).

End portions of the stress adjusting screw 308 and the substrate support body 304 are formed in arc shapes having radius of curvature of 3 mm.

In this specific example, the Bragg wavelength of the waveguide grating 2 before applying a stress was 1545.2 nm at room temperature, that was 0.2 nm larger than the desired. Bragg wavelength of 1545.0 nm.

Figure 13:
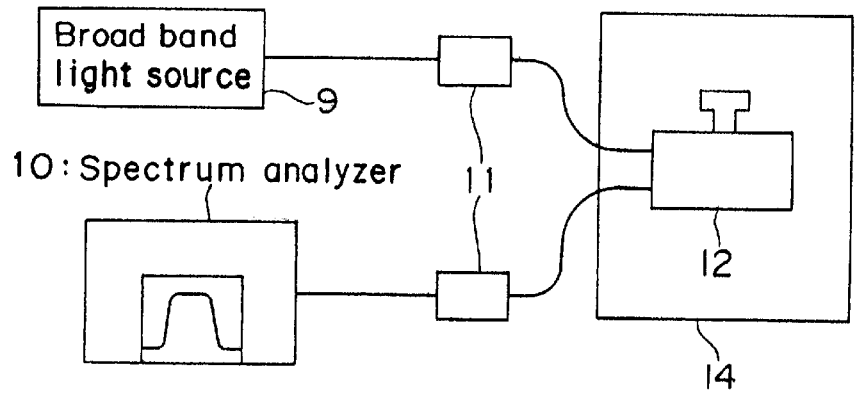
FIG. 13 is a block diagram of the measurement system for measuring the temperature characteristic of the waveguide grating device.

The Bragg wavelength was adjusted to 1545.0 nm by turning the stress adjusting screw 308 while observing the Bragg wavelength and setting the temperature of a thermostat 14 to 25° C., in the optical system shown in FIG. 13.

Then the Bragg wavelength was measured while changing the temperature of the thermostat 14. The measurement showed that changing rate of the Bragg wavelength with the temperature was 0.002 nm/° C. in a range from 10° C. to 80° C., reduced to one fifth that of the prior art.

In a thermal cycle test from –20° C. to 80° C., the substrate support bodies and the stress applying portion having pointed tips lead to breakage at about 500 cycles, while the life before breakage increased to about 1000 cycles indicating improved reliability in this specific example where the tips were made in arc shapes.

Embodiment 12

Figure 37:
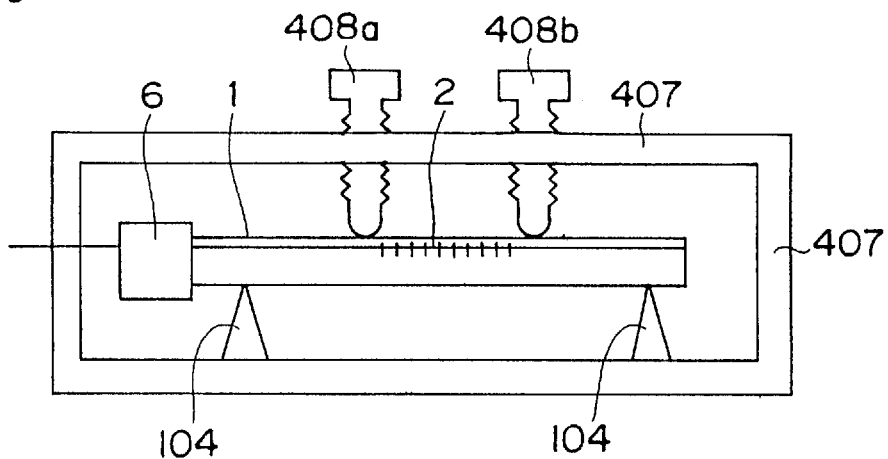
FIG. 37 is a side view schematically showing the constitution of the twelfth embodiment of the present invention.

The waveguide grating device according to the twelfth embodiment of the present invention is constituted similarly to the ninth embodiment, except for two stress adjusting screws 408a, 408b and a casing 407 where the two stress adjusting screws 408a, 408b can be installed are used instead of the stress adjusting screw 108 and the casing 107 of the waveguide grating device of the ninth embodiment, as shown in FIG. 37. The waveguide grating device according to the twelfth embodiment made in this constitution is not only capable of improving the temperature characteristic but also capable of preventing the spectrum from changing with the temperature.

In the twelfth embodiment, the two stress adjusting screws 408a, 408b are disposed so as to apply pressure to the substrate 3 on both sides of the waveguide grating 2, so that the stress adjusting screws 408a, 408b do not make direct contact with the waveguide grating.

A specific example of the waveguide grating device of the twelfth embodiment will be described below.

The present invention is not limited to the following specific example.

In this specific example, a band pass filter having a target Bragg wavelength of 1545.0 nm was fabricated by using the casing 407 made of Invar (thermal expansion coefficient $1\times10^{-6}$) measuring 50 mm in width, 20 mm in height and 20 mm in depth, the stress adjusting screws 408a, 408b and the substrate support body 104 both made of aluminum (thermal expansion coefficient $24\times10^{-6}$)

In this specific example, the Bragg wavelength before applying a stress was 1545.2 nm at room temperature, that was 0.2 nm larger than the desired Bragg wavelength of 1545.0 nm. The Bragg wavelength was adjusted to 1545.0 nm by turning the stress adjusting screws 408s, 408b while observing the Bragg wavelength and setting the temperature of a thermostat 14 to 25° C., in the optical system shown in FIG. 13.

Then the Bragg wavelength was measured while changing the temperature of the thermostat 14. The measurement showed that the changing rate of the Bragg wavelength with the temperature was 0.002 nm/° C. in a range from 10° C. to 80° C., that was one fifth that of the prior art.

Observation of the wavelength spectrum along with the Bragg wavelength while changing the temperature of a thermostat 14 showed that the wavelength spectrum experienced no significant changes as the temperature changed.

In the case of the stress adjusting screw touches the waveguide grating 2 as in the ninth embodiment, the wavelength spectrum changes somewhat when the temperature is changed from 10° C. to 80° C. This is because a force applied directly by the stress adjusting screw 108 onto the waveguide grating 2 causes the refractive index of this portion to change due to the photoelasticity effect. In the twelfth embodiment, by contrast, pressure can be applied without changing the refractive index of the portion where the waveguide grating 2 is formed, by using the two stress adjusting screws 408a, 408b to pressurize the portions on both sides of the waveguide grating 2, not on the waveguide grating 2. Since the temperature characteristic can be compensated without changing the refractive index of the waveguide grating 2 by this configuration, the temperature characteristic can be improved and the wavelength spectrum can be prevented from changing due to the pressure.

Embodiment 13

Figure 38:
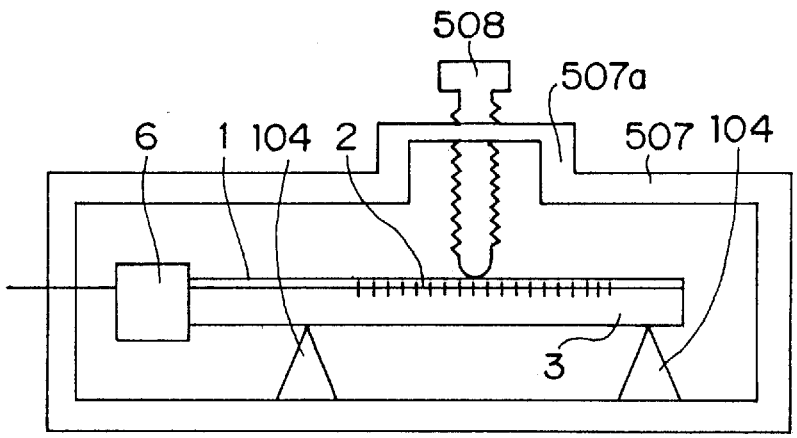
FIG. 38 is a side view schematically showing the constitution of the thirteenth embodiment of the present invention.
Figure 39:
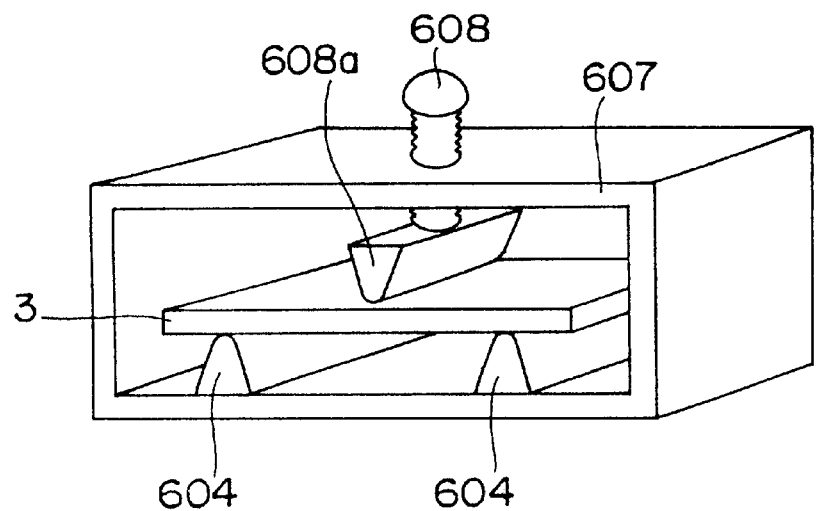
FIG. 39 is a side view schematically showing the constitution of the fourteenth embodiment of the present invention.

The waveguide grating device (band pass filter) according to the thirteenth embodiment of the present invention is constituted similarly to the first embodiment, except for a stress adjusting screw 508 and a casing 507 that has an adjust screw mounting portion 507a whereon the stress adjusting screw 508 is mounted are used instead of the stress adjusting screw 108 and the casing 107 of the waveguide grating device of the ninth embodiment, as shown in FIG. 38.

In the waveguide grating device according to the thirteenth embodiment, the adjust screw mounting portion 507a is provided to protrude from the top surface of the casing 507, thereby making it possible to decrease the thickness of the casing 507 as a whole and use the stress adjusting screw 508 that has a length required for making temperature compensation.

Also in the waveguide grating device of the thirteenth embodiment shown in FIG. 38, the substrate is disposed so that the surface thereof whereon the waveguide grating 2 is formed opposes the stress adjusting screw 508, the stress adjusting screw 508 and the substrate support bodies 104 are formed from materials that have thermal expansion coefficients higher than that of the casing 507, thereby compensating for the change in Bragg wavelength of the waveguide grating 2 with the temperature.

A specific example of the waveguide grating device of the twelfth embodiment will be described below. The present invention is not limited to the following specific example.

In this specific example, a band pass filter having a target Bragg wavelength of 1545.0 nm was fabricated by using the casing 507 made of Invar (thermal expansion coefficient $1\times10^{-6}$) measuring 50 mm in width, 15 mm in height and 20 mm in depth, the stress adjusting screw 508 and the substrate support body 104 both made of aluminum (thermal expansion coefficient $24\times10^{-6}$).

Height of the casing 507 is set to 20 mm at a portion where the adjust screw mounting portion 507a is installed.

The casing 507 as a whole was made of Invar including the adjust screw mounting portion 507a.

In this specific example, the Bragg wavelength of the waveguide grating 2 before applying a stress was 1545.2 nm at room temperature, that was 0.2 nm larger than the desired Bragg wavelength of 1545.0 nm.

The Bragg wavelength was adjusted to 1545.0 nm by turning the stress adjusting screw 508 while observing the Bragg wavelength and setting the temperature of a thermostat 14 to 25° C., in the optical system shown in FIG. 13.

Then the Bragg wavelength was measured while changing the temperature of the thermostat 14.

The measurement showed that the changing rate of the Bragg wavelength with the temperature was 0.002 nm/° C. in a range from 10° C. to 80° C., that was one fifth that of the prior art.

In the waveguide grating device of the thirteenth embodiment, as described above, thickness (15 mm) of the casing 507 excluding the adjust screw mounting portion 507a can be made smaller than that of the casing 107 (20 mm) of the waveguide grating device of the ninth embodiment, while achieving temperature characteristic equivalent to that of the waveguide grating device of the ninth embodiment.

Embodiment 14

The waveguide grating device (band pass filter) according to the fourteenth embodiment of the present invention is characterized by a blade 608a installed between a stress adjusting screw 608 and the substrate 3, thereby improving the reliability.

Specifically, substrate support bodies 604 are installed in parallel on the bottom of a casing 607 made similarly to the casing 107 of the ninth embodiment, and the substrate 3 with the waveguide grating and the waveguide formed thereon is placed on the substrate support bodies 604.

End portions of the substrate support bodies 604 (end portions in contact with the substrate 3) are made in an arc shape having center located on an axis that is parallel to the substrate 3.

The blade 608a is mad of, for example, Teflon, and an end portions of the substrate support bodies 604 (end portions in contact with the substrate 3) are made in an arc shape having center located on an axis that is parallel to the substrate 3. The blade 608a is installed on the waveguide grating at a position right below the stress adjusting screw 608 so that the longitudinal direction of the blade 608a crosses the waveguide grating at right angles.

In the fourteenth embodiment, end portions of the substrate support body 604 that make contact with the substrate 3 are also made in an arc shape having center located on an axis that is parallel to the substrate 3.

The substrate 3 is installed so that the surface of the substrate opposite to the side where the waveguide grating is formed makes contact with the substrate support bodies 604.

The blade 608a is mad of, for example, Teflon, and end portions of the substrate support bodies 604 (end portions in contact with the substrate 3) are made in an arc shape having center located on an axis that is parallel to the substrate 3. The blade 608a is installed on the waveguide grating at a position right below the stress adjusting screw 608 so that the longitudinal direction of the blade 608a crosses the waveguide grating at right angles.

In the fourteenth embodiment, end portions of the substrate support body 604 that make contact with the substrate 3 are also made in an arc shape having center located on an axis that is parallel to the substrate 3.

In the fourteenth embodiment, the stress adjusting screw 608 and the substrate support bodies 604 are formed from materials that have thermal expansion coefficients higher than that of the casing 607, thereby compensating for the change in Bragg wavelength of the waveguide grating 2 with the temperature.

In the waveguide grating device of the fourteenth embodiment constituted as described above, the Bragg wavelength can be adjusted in the increasing sense by tightening the stress adjusting screw 608 (applying a force in the direction of bending the substrate by moving downward), thereby compensating for the change in the Bragg wavelength with temperature due to the difference in the thermal expansion coefficient between the stress adjusting screw 608, the substrate support body 604 and the casing 607.

Also in the waveguide grating device of the fourteenth embodiment, since the end portions of the blade 608a and substrate support bodies 604 (portions in contact with the substrate 3) are made in an arc shape having radius of curvature, thus making it possible to prevent the substrate from breaking since the substrate 3 can be loaded without concentrating the force at one point of the substrate.

Now a specific example of the waveguide grating device of the fourteenth embodiment will be described below. The present invention is not limited to the following specific example.

In this specific example, a band pass filter having a target Bragg wavelength of 1545.0 nm was fabricated by using the casing 607 made of aluminum (thermal expansion coefficient $24 \times 10^{-6}$) measuring 50 mm in width, 20 mm in height and 20 mm in depth, the stress adjusting screw 608, the substrate support body 604 and the blade 608a all made of aluminum (thermal expansion coefficient $90 \times 10^{-6}$)

In this specific example, the Bragg wavelength of the waveguide grating 2 before applying a stress was 1545.2 nm at room temperature, that was 0.2 nm larger than the desired Bragg wavelength of 1545.0 nm.

The Bragg wavelength was adjusted to 1545.0 nm by turning the stress adjusting screw 608 while observing the Bragg wavelength and setting the temperature of the thermostat 14 to 25° C., in the optical system shown in FIG. 13.

Then the Bragg wavelength was measured while changing the temperature of the thermostat 14.

The measurement showed that the changing rate of the Bragg wavelength with the temperature was 0.002 nm/° C. in a range from 10° C. to 80° C., that was one fifth that of the prior art.

Embodiment 15

The waveguide grating device (dispersion compensator) according to the fifteenth embodiment of the present invention is characterized by a load splitting member 708a made in a shape of rectangular C installed between a stress adjusting screw 708 and the substrate 3 thereby prevent direct loading onto the waveguide grating 2a.

Figure 40A:
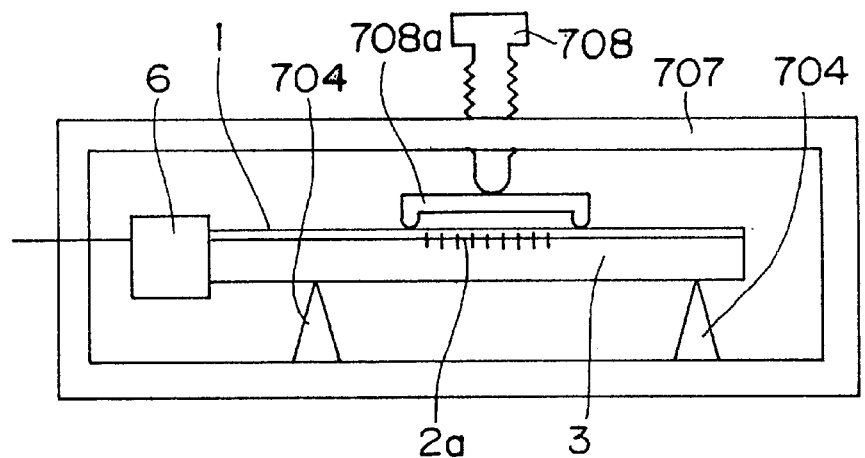
FIGS. 40A and 40B are schematic diagrams showing the constitution of the fifteenth embodiment of the present invention, FIG. 40A showing a side view in lateral direction and FIG. 40B showing a side view in longitudinal direction.
Figure 40B:
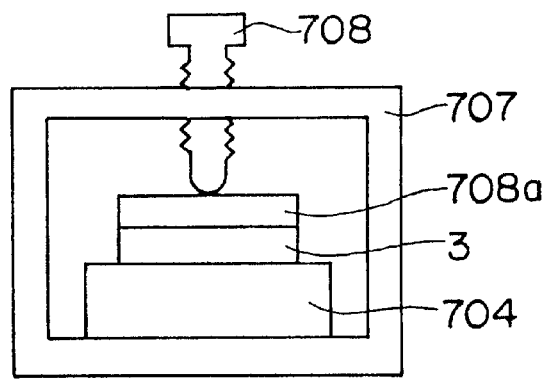

Specifically, as shown in FIG. 40, the load splitting member 708a is placed on the substrate 3 to straddle the waveguide grating 2a, thereby to apply a load onto the load splitting member 708a with the stress adjusting screw 708.

In the waveguide grating device shown in FIG. 40, the casing 707 and the substrate support bodies 704 are made in similar constitutions as those of the casing 107 and the substrate support bodies 104 of the ninth embodiment, respectively.

The end portion of the load splitting member 708a (end portion in contact with the substrate 3) is preferably made in an arc shape having radius of curvature in order to prevent the substrate from breaking and improving the reliability.

In the fifteenth embodiment, the substrate is installed so that the surface thereof opposite to the surface whereon the waveguide grating 2 and the waveguide are formed makes contact with the substrate support bodies 704, while the stress adjusting screw 708 and the substrate support bodies 704 are formed from materials that have thermal expansion coefficients higher than that of the casing 707, thereby compensating for the change in Bragg wavelength of the waveguide grating 2a with the temperature.

The waveguide grating device (dispersion compensator) of the fifteenth embodiment constituted as described above makes dispersion compensating operation similar to that of the dispersion compensator of the seventh embodiment, and has excellent performance as described below similarly to the seventh embodiment.

(1) The waveguide grating device of the fifteenth embodiment allows it to adjust the Bragg wavelength in the decreasing sense by tightening the stress adjusting screw 708 (applying a force in the direction of bending the substrate by moving downward).

(2) Changes in the Bragg wavelength with temperature can be compensated for by the difference in the thermal expansion coefficient between the stress adjusting screw 708, the substrate support body 704 and the casing 707.

(3) Deterioration of the dispersion compensation characteristic (change in amount of dispersion) making adjustment of (1) and temperature compensation of (2) described above is less than the dispersion compensator of the seventh embodiment.

While the amount of dispersion of the dispersion compensator is desired to be constant as the temperature changes, keeping the amount of dispersion constant requires it to apply a uniform stress to the waveguide grating and to prevent the refractive index from changing due to strain. However, when a load is applied with the stress adjusting screw directly onto the portion where the waveguide grating 2a is formed, the compressive stress applied to the waveguide grating 2a becomes somewhat uneven and, moreover, refractive index of the portion of the waveguide grating 2a that makes contact with the stress adjusting screw changes due to the photoelasticity effect, and therefore the wavelength characteristic and the dispersion characteristic change.

However, when the stress is applied via the load splitting member 708a so that the waveguide grating 2a is not directly loaded as in the waveguide grating device of the fifteenth embodiment, the compressive stress applied to the waveguide grating 2a can be made substantially uniform. Also because the waveguide grating 2a is not directly loaded, change in the refractive index of the waveguide grating due to the photoelasticity effect does not occur.

For these reasons, the wavelength characteristic and the dispersion characteristic can be prevented from occurring in the waveguide grating device (dispersion compensator) of the fifteenth embodiment.

As described above, waveguide grating device of the fifteenth embodiment makes it possible to very easily adjust the Bragg wavelength of the dispersion compensator that has been produced, thus improving the production yield and reducing the cost.

Now a specific example of the waveguide grating device of the fifteenth embodiment will be described below. The present invention is not limited to the following specific example.

In this specific example, a dispersion compensator having a target Bragg wavelength of 1551.0 nm was fabricated by using the casing 707 made of Invar (thermal expansion coefficient $1\times10^{-6}$) measuring 50 mm in width, 20 mm in height and 20 mm in depth, the stress adjusting screw 708, the substrate support body 704 and the load splitting member 708a all made of aluminum (thermal expansion coefficient $24\times10^{-6}$).

In this specific example, the Bragg wavelength of the waveguide grating 2a before applying a stress was 1552.0 nm at room temperature, that was 1.0 nm larger than the desired Bragg wavelength of 1551.0 nm.

The Bragg wavelength was adjusted to 1551.0 nm by turning the stress adjusting screw 708 while observing the Bragg wavelength and setting the temperature of the thermostat 14 to 25° C., in the optical system shown in FIG. 13.

Then the Bragg wavelength was measured while changing the temperature of the thermostat 14.

The measurement showed that the changing rate of the Bragg wavelength with the temperature was 0.002 nm/° C. in a range from 10° C. to 80° C., that was one fifth that of the prior art.

It was verified that deterioration of the dispersion characteristic could be mitigated in the temperature range described above.

Figure 41A:
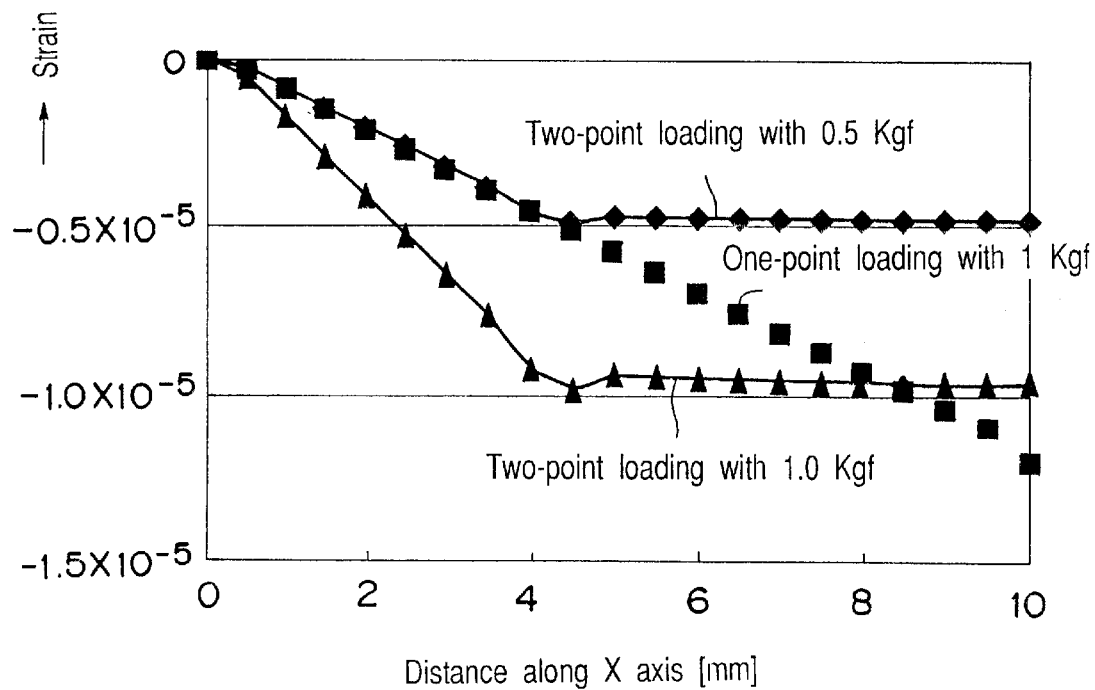
FIG. 41A is a graph showing the distribution of deflection produced in a substrate when subjected to a load applied at one point and when subjected to a load applied at two points as in the case of the fifteenth embodiment.

FIG. 41A is a graph showing the distribution of deflection produced in the substrate 3 when subjected to a load applied at one point and when subjected to a load applied at two points as in the case of the fifteenth embodiment.

Figure 41B:
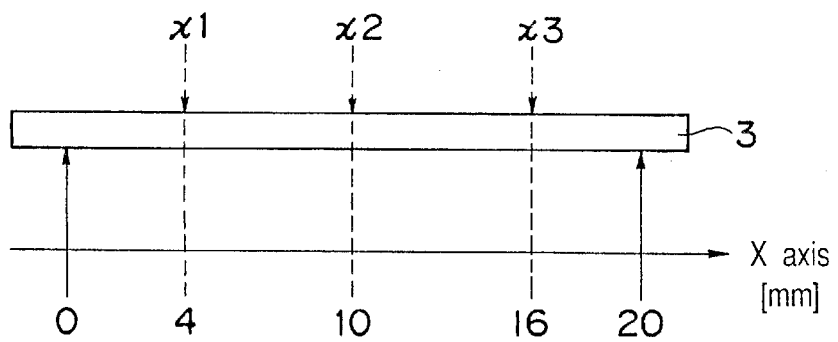
FIG. 41B is diagrammatic illustration of the substrate showing the supporting positions and the loading positions.
Figure 42A:
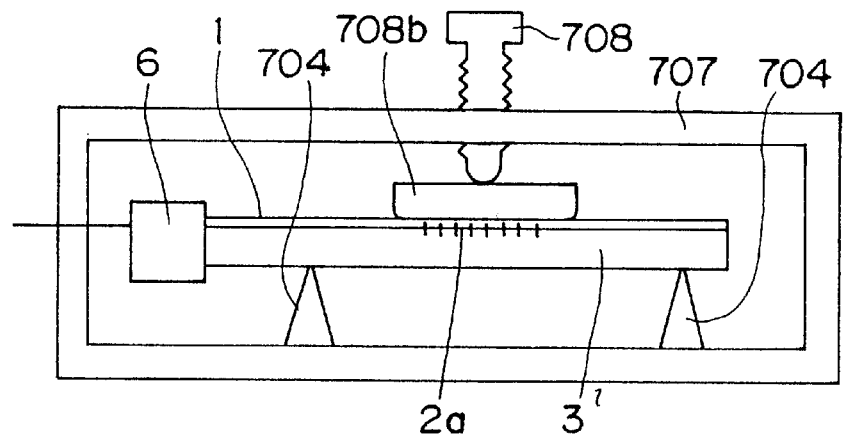
FIGS. 42A and 42B are schematic diagrams showing the constitution of a modification of the fifteenth embodiment of the present invention, FIG. 42A showing a side view in lateral direction and FIG. 42B showing a side view in longitudinal direction.
Figure 42B:
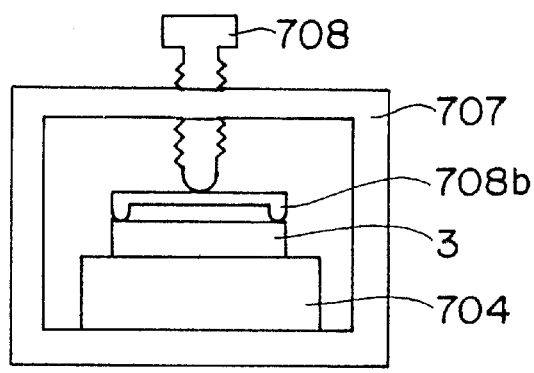

Specifically, the substrate 3 having a thickness of 1 mm was supported at positions of x=0 mm and x=20 mm as shown in FIG. 41B. Then the amount of deflection of the substrate 3 under load equally distributed among two points of x1 (x=4 mm) and x3 (x=16 mm) (two-point loading) and the amount of deflection of the substrate 3 under load applied to a point of x2 (x=10 mm) only (one-point loading) were simulated for a plurality of points along x axis, with the results being shown with respect to the distance along the x axis.

The simulation shown in FIG. 41B was conducted using the finite element method. While the amounts of deflection in a region from x=0 mm to x=10 mm are shown in FIG. 41A, it is apparent from the symmetry of the sample configuration that similar deflection distribution would be obtained in a region from x=10 mm to x=20 mm.

As shown in FIG. 41A, deflection remains constant over a region of the two points where load was applied (between x1 (x=4 mm) and x3 (x=16 mm)) in the case of two-point loading, although the deflection decreases monotonously toward the loading point x2 without any region where the deflection remains constant in the case of one-point loading.

The result described above suggests that, when the waveguide grating is formed between the two loading points, in other words, when the load is applied at two points that interpose the region where the waveguide grating is formed, the amount of deflection due to the load can be made constant over the region where the waveguide grating is formed, thereby preventing the. dispersion characteristic from deteriorating due to the load.

The dispersion compensator has been described in the fifteenth embodiment. However, Bragg wavelength of the waveguide can be adjusted without causing the device characteristics to deteriorate, similarly to the fifteenth embodiment, by applying two-point loading to other types of waveguide grating device such as multiplexer/demultiplexer and band-pass filter.

Although the load splitting member 708a is configured to straddle the waveguide grating 2a in the longitudinal direction in the fifteenth embodiment, the present invention is not limited to this configuration and such a configuration may be employed as load splitting member 708a straddles the waveguide grating 2a in the lateral direction which also has the effect similar to that of the fifteenth embodiment.

Embodiment 16

The waveguide grating device according to the sixteenth embodiment of the present invention is a dispersion compensator similar to that of the fifteenth embodiment, wherein a flat load splitting member 808a is used instead of the a load splitting member 708a having the shape of rectangular C in the waveguide grating device of the fifteenth embodiment.

Figure 43:
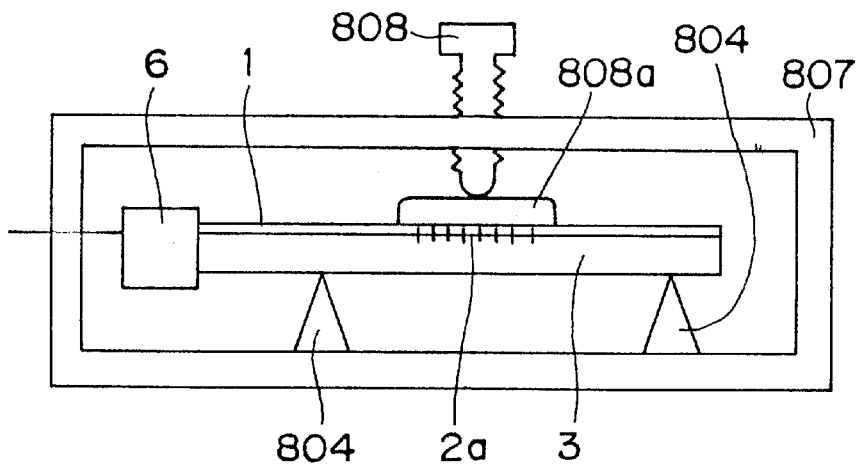
FIG. 43 is a side view schematically showing the constitution of the sixteenth embodiment of the present invention.

Specifically, as shown in FIG. 43, the load splitting member 808a is placed on the waveguide grating 2a of the substrate 3, thereby to apply a load onto the load splitting member 808a with a stress adjusting screw 808.

In the waveguide grating device shown in FIG. 43, a casing 807 and substrate support bodies 804 are made in similar constitutions as those of the casing 107 and the substrate support bodies 104 of the ninth embodiment, respectively.

In the sixteenth embodiment, the substrate 3 is installed so that the surface of the substrate 3 opposite to the surface whereon the waveguide grating 2 and the waveguide are formed makes contact with the substrate support bodies 804, while the stress adjusting screw 808 and the substrate support bodies 804 are formed from materials that have thermal expansion coefficients higher than that of the casing 807, thereby compensating for the change in Bragg wavelength of the waveguide grating 2a with the temperature.

The waveguide grating device (dispersion compensator) of the sixteenth embodiment constituted as described above makes dispersion compensating operation similar to that of the dispersion compensator of the fifteenth embodiment, and has excellent performance similarly to the fifteenth embodiment.

Now a specific example of the waveguide grating device of the sixteenth embodiment will be described below. The present invention is not limited to the following specific example.

In this specific example, a dispersion compensator having a target Bragg wavelength of 1551.0 nm was fabricated by using the casing 807 made of Invar (thermal expansion coefficient 1×10⁻⁶) measuring 50 mm in width, 20 mm in height and 20 mm in depth, the stress adjusting screw 808, the substrate support body 804 and the load splitting member 808a all made of aluminum (thermal expansion coefficient 24×10⁻⁶).

In this specific example, the Bragg wavelength of the waveguide grating 2a before applying a stress was 1552.0 nm at room temperature, that was 1.0 nm larger than the desired Bragg wavelength of 1551.0 nm.

The Bragg wavelength was adjusted to 1551.0 nm by turning the stress adjusting screw 808 while observing the Bragg wavelength and setting the temperature of the thermostat 14 to 25° C., in the optical system shown in FIG. 13.

Then the Bragg wavelength was measured while changing the temperature of the thermostat 14.

The measurement showed that the changing rate of the Bragg wavelength with the temperature was 0.002 nm/° C. in a range from 10° C. to 80° C., that was one fifth that of the prior art.

It was verified that deterioration of the dispersion characteristic could be mitigated in the temperature range described above.

The sixteenth embodiment is described by taking the dispersion compensator as an example, although this embodiment of the present invention can be applied to other waveguide grating devices such as multiplexer/demultiplexer and band pass filter.

Embodiment 17

The waveguide grating device according to the seventeenth embodiment of the present invention is a multiplexer/demultiplexer comprising 3 dB couplers 5, 5' provided on both sides of the waveguide grating 2 on the substrate 3. Specifically, in the plan view shown in FIG. 34A, the 3 dB coupler 5' is constituted by forming part of two waveguides located between the ports P3, 4 and the waveguide gratings 2 so as to couple with each other.

Figure 44:
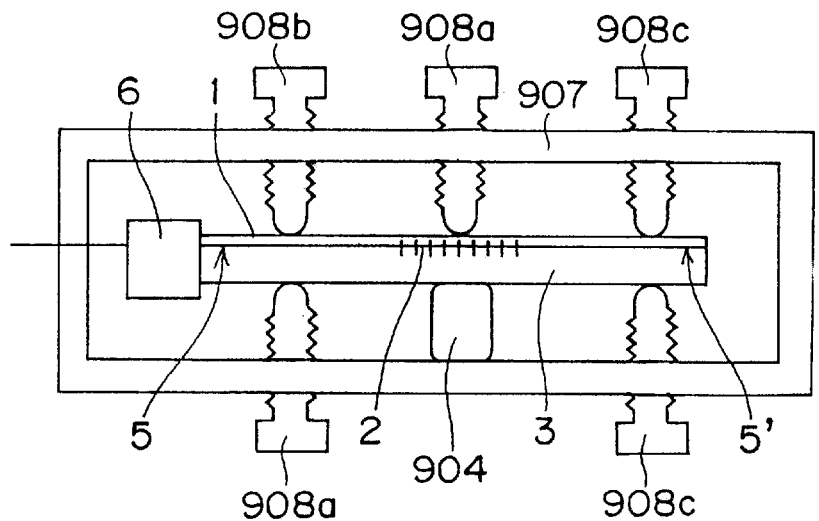
FIG. 44 is a side view schematically showing the constitution of the seventeenth embodiment of the present invention.

The waveguide grating device (multiplexer/demultiplexer) of the seventeenth embodiment comprises the substrate 3 that is constituted as described above and operates as the multiplexer/demultiplexer being installed in a casing 907 as shown in FIG. 44.

Specifically, the substrate 3 is supported in the casing 907 by stress adjusting screws 908b, 908d that are installed movably in the casing 907 facing each other and stress adjusting screws 908c, 908e.

A stress adjusting screw 908a is installed between the stress adjusting screws 908b, 908c, and substrate support bodies 904 are installed between the stress adjusting screws 908d, 908e to interpose the substrate 3 while opposing the stress adjusting screw 908a. The stress adjusting screw 908a and the substrate support bodies 904 are installed to interpose the portion of the stress adjusting screw whereon the waveguide grating 2 is formed.

In the waveguide grating device (multiplexer/demultiplexer) of the seventeenth embodiment that is constituted as described above, when signals of several wavelengths (λ1, λ2, λ3, ...) are fed to the port P1, only the signal light that has a particular wavelength (λn) that corresponds to the period of the waveguide grating 2 is reflected on the waveguide grating 2 and is output from the port P2 (demultiplexing), with other signal light of different wavelengths being output from the port P4. The signal light of a particular wavelength (λn) that is input through the port P3 is reflected on the waveguide grating 2 and is output from the port P4 (multiplexing).

In the multiplexer/demultiplexer of the seventeenth embodiment that is constituted as described above, the Bragg wavelength can be adjusted by changing the stress generated in the portion where the waveguide grating 2 is formed by the five stress adjusting screws 908a, 908b, 908c, 908d, 908e.

In the seventeenth embodiment, the casing 907 and the stress adjusting screw 908b, 908c, 908d, 908e are made of a material that has a thermal expansion coefficient lower than that of the stress adjusting screw 908a, and the substrate support bodies 904 are made of a material that has a thermal expansion coefficient lower than that of the stress adjusting screws 908b, 908c, 908d, 908e. With this constitution, the compressive stress increases in the portion of the waveguide grating as the temperature rises, so that the temperature characteristic is compensated since the Bragg wavelength changes in the decreasing sense as shown in FIG. 2A. When the temperature drops, on the contrary, pressure is applied on the side of the substrate support bodies 904 leading to increased tensile stress thereby compensating the temperature characteristic.

In the waveguide grating device of the seventeenth embodiment that is constituted as described above, temperature compensation of the Bragg wavelength is made by compressive stress when the temperature is higher, and temperature compensation of the Bragg wavelength is made by compressive stress when the temperature is lower, so that temperature compensation can be made over a wider range of temperatures.

Now a specific example of the waveguide grating device of the seventeenth embodiment will be described below. The present invention is not limited to the following specific example.

In this specific example, a multiplexer/demultiplexer having a target Bragg wavelength of 1545.0 nm was fabricated by using the casing 907 and the stress adjusting screws 908b, 908c, 908d, 908e all made of Invar (thermal expansion coefficient 1×10⁻⁶), the stress adjusting screw 908a made of aluminum (thermal expansion coefficient 24×10⁻⁶) and the substrate support bodies 904 made of crystallized glass (thermal expansion coefficient −6×10⁻⁶).

The casing 907 made of Invar was made in dimensions of 50 mm in width, 20 mm in height and 20 mm in depth.

In this specific example, the Bragg wavelength of the waveguide grating 2 before applying a stress was 1545.2 nm at room temperature, that was 0.2 nm larger than the desired Bragg wavelength of 1545.0 nm.

The Bragg wavelength was adjusted to 1545.0 nm by turning the stress adjusting screws 908s, 908d, 908e while observing the Bragg wavelength and setting the temperature of the thermostat 14 to 25° C., in the optical system shown in FIG. 13.

When the Bragg wavelength of the waveguide grating 2 is larger than the target Bragg wavelength, it can be adjusted by tightening the stress adjusting screws 908s, 908d, 908e strongly thereby generating a compressive stress in the portion where the waveguide grating 2 is formed. When the Bragg wavelength of the waveguide grating 2 is smaller than the target Bragg wavelength, it can be adjusted by tightening the stress adjusting screws 908b, 908c strongly thereby generating a tensile stress in the portion where the waveguide grating 2 is formed.

Then the Bragg wavelength was measured while changing the temperature of the thermostat 14.

The measurement showed that the changing rate of the Bragg wavelength with the temperature was 0.002 nm/° C. in a range from −40° C. to 80° C., that was one fifth that of the prior art.

As described above, the waveguide grating device of the seventeenth embodiment proved to be effective in easily controlling the Bragg wavelength and improving the temperature characteristic over wider range of temperatures than the other embodiments.

The seventeenth embodiment is described by taking the multiplexer/demultiplexer as an example, although this embodiment of the present invention can be applied to other waveguide grating devices such as dispersion compensator and band pass filter.

Embodiment 18

Figure 45:
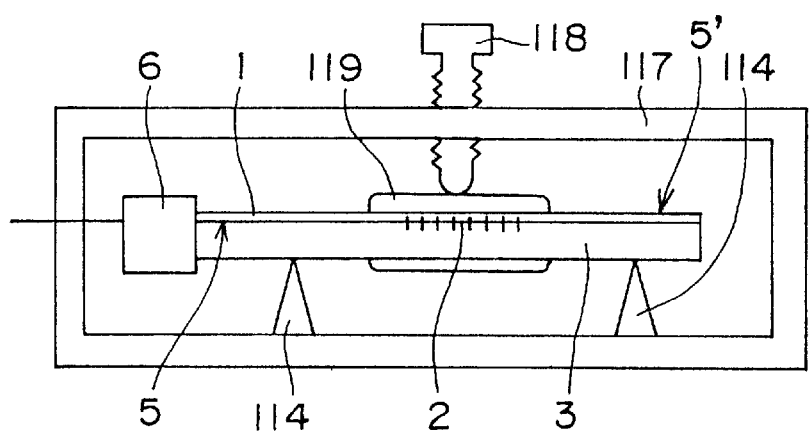
FIG. 45 is a side view schematically showing the constitution of the eighteenth embodiment of the present invention.

The waveguide grating device according to the eighteenth embodiment of the present invention is a multiplexer/demultiplexer, similarly to the seventeenth embodiment, and has the substrate 3 that is constituted similarly to the seventeenth embodiment and is installed in a casing 117, as shown in FIG. 45.

In the waveguide grating device according to the eighteenth embodiment, the substrate 3 is placed on substrate support bodies 114 that are disposed in parallel to each other on the bottom of the casing 117.

The portion of the substrate 3 where the waveguide grating 2 is formed is covered with a organic material layer 119, with a load applied by a stress adjusting screw 118 via the organic material layer 119 thereby to bend the substrate 3.

The organic material layer may also be provided to cover the substrate 3 as a whole.

In the eighteenth embodiment, the organic material layer 119 was formed by applying polymethyl methacrylate (PMMA) to a thickness of 0.5 mm on the waveguide surface, the substrate surface and the side faces of the substrate by spin coating.

Specifically, charge transfer type carbazole and solubilized phthalocyanine were dissolved in chloroform solution of PMMA, with the resultant solution being dripped onto the surface of the substrate where the waveguide grating was formed that was set in a spin coater. As the solution spread into a thin film over the surface by the centrifugal force and the liquid evaporated, the PMMA film was formed.

In the eighteenth embodiment, the substrate 3 is installed so that the surface thereof opposite to the surface whereon the waveguide grating and the waveguide are formed makes contact with the substrate support bodies 114, while the stress adjusting screw 118 and the substrate support bodies 114 are formed from materials that have thermal expansion coefficients higher than that of the casing 117, thereby compensating for the change in Bragg wavelength of the waveguide grating 2 with the temperature.

In the waveguide grating device (multiplexer/demultiplexer) of the eighteenth embodiment constituted as described above, the Bragg wavelength can be adjusted in the decreasing sense by tightening the stress adjusting screw 118 (applying a force in the direction of bending the substrate by moving downward), thereby decreasing and adjusting the Bragg wavelength.

Changes in the Bragg wavelength with temperature can be compensated for by the difference in the thermal expansion coefficient between the stress adjusting screw 118, the substrate support body 114 and the casing 117, A specific example of the waveguide grating device of the eighteenth embodiment will be described below. The present invention is not limited to the following specific example.

In this specific example, a multiplexer/demultiplexer having a target Bragg wavelength of 1545.0 nm was fabricated by using the casing 117 made of Invar (thermal expansion coefficient $1 \times 10^{-6}$) measuring 50 mm in width, 20 mm in height and 20 mm in depth, the stress adjusting screw 118 and the substrate support body 114 both made of aluminum (thermal expansion coefficient $24 \times 10^{-6}$).

In this specific example, the Bragg wavelength of the waveguide grating 2a before applying a stress was 1545.2 nm at room temperature, that was 0.2 nm larger than the desired Bragg wavelength of 1545.0 nm.

The Bragg wavelength was adjusted to 1545.0 nm by turning the stress adjusting screw 118 while observing the Bragg wavelength and setting the temperature of a thermostat 14 to 25° C., in the optical system shown in FIG. 13.

Then the Bragg wavelength was measured while changing the temperature of the thermostat 14.

The measurement showed that the changing rate of the Bragg wavelength with the temperature was 0.002 m/° C. in a range from 10° C. to 80° C., that was one fifth that of the prior art.

The waveguide grating device of the eighteenth embodiment is capable of improving the reliability, since the organic material layer 119 is formed.

A quartz film or a silicon substrate used for forming a waveguide tends to deteriorate in a high-temperature and high-humidity atmosphere, resulting in decreased mechanical strength.

In the eighteenth embodiment, however, since the organic material layer 119 is formed, deterioration of the mechanical strength can be prevented thereby improving the reliability.

10 samples of the specific example according to the eighteenth embodiment were fabricated and subjected to 500 cycles of heat and humidity cycle test in a temperature range from 10° C. to 80° C. under humidity of 90% RH. After the test, no sample failed.

In a similar test on samples without the organic material layer 119, five out of ten samples showed crack on the surface. From this result, it was verified that the organic material layer improved the reliability.

Embodiment 19

Figure 46:
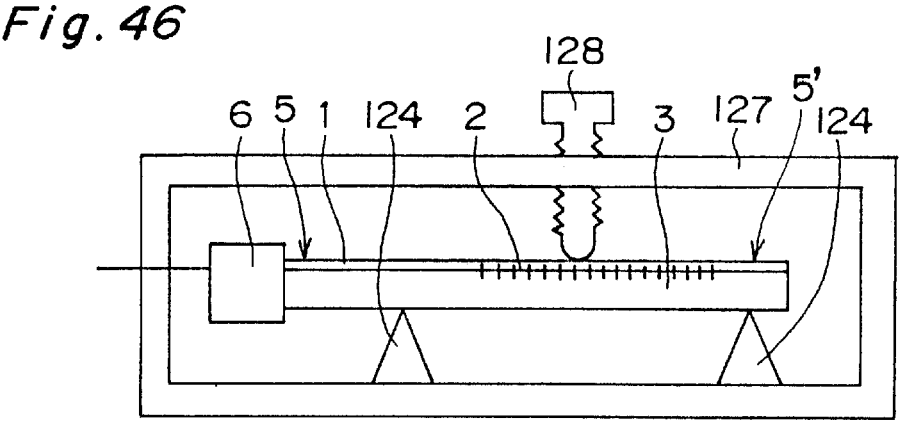
FIG. 46 is a side view schematically showing the constitution of the nineteenth embodiment of the present invention.

The waveguide grating device according to the nineteenth embodiment of the present invention has the constitution of the waveguide grating device of the eighteenth embodiment wherein the organic material layer 119 is eliminated and the inside of the casing 127 is filled with nitrogen and hermetically sealed instead, as shown in FIG. 46.

Specifically, the casing 117 and the stress adjusting screw 118 of the eighteenth embodiment were replaced with the casing 127 and the stress adjusting screw 128 that can be hermetically sealed.

In the waveguide grating device of the nineteenth embodiment, the substrate support body 124 is constituted similarly to the substrate support body 114 of the eighteenth embodiment.

In the nineteenth embodiment, the substrate 3 is installed so that the surface thereof opposite to the surface whereon the waveguide grating and the waveguide are formed makes contact with the substrate support bodies 124, while the stress adjusting screw 128 and the substrate support bodies 124 are formed from materials that have thermal expansion coefficients higher than that of the casing 127, thereby compensating for the change in Bragg wavelength of the waveguide grating 2 with the temperature.

In the waveguide grating device (multiplexer/demultiplexer) of the nineteenth embodiment constituted as described above, the Bragg wavelength can be adjusted in the decreasing sense by tightening the stress adjusting screw 128 (applying a force in the direction of bending the substrate by moving downward), thereby decreasing and adjusting the Bragg wavelength.

Changes in the Bragg wavelength with temperature can be compensated for by the difference in the thermal expansion coefficient between the stress adjusting screw 128, the substrate support body 124 and the casing 127.

A specific example of the waveguide grating device of the nineteenth embodiment will be described below. The present invention is not limited to the following specific example.

In this specific example, a multiplexer/demultiplexer having a target Bragg wavelength of 1545.0 nm was fabricated by using the casing 127 made of Invar (thermal expansion coefficient $1 \times 10^{-6}$) measuring 50 mm in width, 20 mm in height and 20 mm in depth, the stress adjusting screw 128 and the substrate support body 124 both made of aluminum (thermal expansion coefficient $24 \times 10^{-6}$).

In this specific example, the Bragg wavelength of the waveguide grating 2a before applying a stress was 1545.2 nm at room temperature, that was 0.2 nm larger than the desired Bragg wavelength of 1545.0 nm.

The Bragg wavelength was adjusted to 1545.0 nm by turning the stress adjusting screw 128 while observing the Bragg wavelength and setting the temperature of a thermostat 14 to 25° C., in the optical system shown in FIG. 13.

Then the Bragg wavelength was measured while changing the temperature of the thermostat 14.

The measurement showed that the changing rate of the Bragg wavelength with the temperature was 0.002 nm/° C. in a range from 10° C. to 80° C., that was one fifth that of the prior art.

In the waveguide grating device of the nineteenth embodiment, mechanical strength of the substrate is prevented from deteriorating and the reliability is improved by the hermetic sealing.

10 samples of the specific example according to the nineteenth embodiment were fabricated and subjected to 500 cycles of heat and humidity cycle test in a temperature range from 10° C. to 80° C. under humidity of 90% RH. After the test, no sample failed.

In a similar test on samples without hermetic sealing, five out of ten samples showed crack on the surface. From this result, it was verified that the organic material layer improved the reliability.

What is claimed is:

1. A waveguide grating device comprising:
   an optical waveguide on a substrate;
   a waveguide grating in a portion of the optical waveguide;
   a casing in which said optical waveguide is disposed;
   substrate support bodies contacting and slidably supporting a first side of said substrate, on opposite sides of the waveguide grating, in said casing; and
   substrate pressing means mounted in said casing and making contact with a second side of said substrate, opposite the first side of said substrate, and movable in a direction perpendicular to said substrate.

2. The waveguide grating device according to claim 1, wherein a distance L1 between said substrate support bodies satisfies t1/L1<0.2 where t1 represents thickness of said substrate.

3. The waveguide grating device according to claim 1, wherein said substrate pressing means has, in cross-section, where contacting the second side of said substrate, an arcuate shape, the arcuate shape having a center located at a point.

4. The waveguide grating device according to claim 1, wherein said substrate pressing means comprises an actuator that expands and contracts in response to an applied voltage.

5. The waveguide grating device according to claim 1, wherein a first portion of said substrate where the waveguide grating is located is thinner than other portions of said substrate.

6. The waveguide grating device according to claim 1, wherein said waveguide grating has a period that changes progressively.

7. The waveguide grating device according to claim 1, wherein said substrate pressing means has in cross-section, where contacting the second side of said substrate, an arc-shaped linear end portion having an axis lying on a straight line that is parallel to said substrate.

8. The waveguide grating device according to claim 1, wherein each of said substrate support bodies has a linear end face having, in cross-section, where contacting the second side of said substrate, an arcuate shape having a radius of curvature with an axis lying on a straight line, parallel to said substrate, each of said substrate support bodies contacting said substrate on the end face.

9. The waveguide grating device according to claim 8, wherein said substrate passing means has in cross-section, where contacting the second principal plane of said substrate, an arc-shaped linear end portion having an axis lying on a straight line that is parallel to said substrate and parallel to each axis of said substrate support bodies.

10. A waveguide grating device comprising:
    a substrate having a waveguide grating with a Bragg wavelength;
    an optical waveguide connected to the waveguide grating;
    a casing;
    substrate support bodies contacting and slidably supporting said substrate in said casing on a first principal plane of said substrate; and
    substrate pressing means mounted in said casing, in contact with a second principal plane of said substrate, opposite the first principal plane, and movable in a direction perpendicular to said substrate or fixed, at least one of said substrate support bodies and said substrate pressing means having a thermal expansion coefficient canceling a change in Bragg wavelength of said waveguide grating caused by a change in temperature.

11. The waveguide grating device according to claim 10, wherein each of said substrate support bodies has a linear end face having, in cross-section, an arcuate shape having a radius of curvature with an axis lying on a straight line, parallel to said substrate, each of said substrate support bodies contacting said substrate at the respective end face.

12. The waveguide grating according to claim 11, wherein an end portion of said substrate pressing means has, in cross-section, where contacting the first principal plane of said substrate, an arcuate shape having a radius of curvature with a center located at a point.

13. The waveguide grating device according to claim 10, including a plurality of said substrate pressing means.

14. The waveguide grating device according to claim 10, wherein said substrate pressing means includes, on an end portion, a load splitting member having first and second end faces that contact said substrate with said first and second end faces straddling said waveguide grating.

15. The waveguide grating device according to claim 10, wherein said substrate pressing means includes, at an end, a flat plate having two parallel surfaces.

16. The waveguide grating device according to claim 10, including an organic material on a surface of said substrate.

17. The waveguide grating device according to claim 10, wherein said substrate is hermetically sealed in said casing.

18. The waveguide grating according to claim 10, wherein an end portion of said substrate pressing means has, in cross-section, where contacting the first principal plane of said substrate, an arc-shaped end portion having an axis lying on a straight line that is parallel to said substrate and to each axis of said substrate support bodies.

* * * * *